(12) United States Patent
Irish et al.

(10) Patent No.: US 9,923,584 B2
(45) Date of Patent: Mar. 20, 2018

(54) RECTIFIERS FOR WIRELESS POWER TRANSFER WITH IMPEDANCE INVERTING FILTERS FOR REDUCED ELECTROMAGNETIC INTERFERENCE

(71) Applicant: QUALCOMM Incorporated, San Diego, CA (US)

(72) Inventors: Linda Stacey Irish, San Diego, CA (US); Arvind Govindaraj, San Diego, CA (US); Paolo Menegoli, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 14/844,140

(22) Filed: Sep. 3, 2015

(65) Prior Publication Data
US 2017/0070249 A1    Mar. 9, 2017

(51) Int. Cl.
*H04B 1/10*    (2006.01)
*H02J 5/00*    (2016.01)
(Continued)

(52) U.S. Cl.
CPC ............ *H04B 1/1027* (2013.01); *H02J 5/005* (2013.01); *H02J 7/025* (2013.01); *H02J 7/04* (2013.01); *H02J 50/12* (2016.02)

(58) Field of Classification Search
CPC ........ H04B 1/1027; H04B 17/00; H04B 7/04; H04B 7/025; H04B 5/005; H04B 50/00; H04B 50/40
See application file for complete search history.

(56) References Cited

U.S. PATENT DOCUMENTS 6,756,864 B2 * 6/2004 Muramatsu .......... H03H 7/0115
                                              333/133
7,026,887 B2 * 4/2006 Watanabe ................. H01P 1/15
                                              333/126
(Continued)

FOREIGN PATENT DOCUMENTS

CN      203014467 U    6/2013
CN      103259345 A    8/2013

OTHER PUBLICATIONS

Kumar A., et al., "Linearly Tuned Wireless Power Pick-Up," IEEE International Conference on Sustainable Energy Technologies (ICSET), 2010, pp. 1-6.
(Continued)

*Primary Examiner* — Helen Rossoshek
(74) *Attorney, Agent, or Firm* — Smith Templ Blaha LLC

(57) ABSTRACT

Resonant rectifier topologies are described for tuning the rectifier so that it performs from an electromagnetic interference (EMI) point of view, while maintaining the voltage regulation at the output that a series tuned rectifier would maintain. Examples include a an inductor of a receive coupler and a rectifier connectable to drive a load, along with first and second filter elements that are each configured to provide an impedance inversion function in a frequency band and that are connected in series between the inductor of a receive coupler and rectifier. In one set of examples, both filter elements are implemented as pair filters, while in other examples the first filter element includes the inductor of a receive coupler in parallel with a capacitance connected to ground.

26 Claims, 15 Drawing Sheets

(51) Int. Cl.
*H02J 7/02* (2016.01)
*H02J 7/04* (2006.01)
*H02J 50/12* (2016.01)

(56) References Cited

U.S. PATENT DOCUMENTS

| | | | | |
|---|---|---|---|---|
| 7,038,557 | B2* | 5/2006 | Nakamura | H04B 1/0057 333/132 |
| 7,348,931 | B2* | 3/2008 | Suzuki | H01Q 1/50 333/168 |
| 7,457,230 | B2* | 11/2008 | Ohkubo | H04B 7/2687 370/208 |
| 7,573,354 | B2* | 8/2009 | Nishihara | H03H 9/605 333/133 |
| 8,154,362 | B2* | 4/2012 | Allen | H03H 7/06 333/168 |
| 8,306,499 | B2* | 11/2012 | Yamakawa | H03H 7/0153 455/307 |
| 8,432,070 | B2* | 4/2013 | Cook | H02J 5/005 307/150 |
| 9,287,851 | B2* | 3/2016 | Mallinson | H03H 15/02 |
| 2005/0219010 | A1* | 10/2005 | Erb | H04B 1/0458 333/126 |
| 2008/0210762 | A1* | 9/2008 | Osada | G06K 19/0701 235/492 |
| 2009/0103332 | A1 | 4/2009 | Sotiriou | |
| 2009/0284220 | A1* | 11/2009 | Toncich | G06K 7/0008 320/108 |
| 2010/0191236 | A1 | 7/2010 | Johnson et al. | |
| 2011/0266882 | A1* | 11/2011 | Yamamoto | H02J 17/00 307/104 |
| 2012/0049648 | A1 | 3/2012 | Choi et al. | |
| 2012/0146575 | A1 | 6/2012 | Armstrong et al. | |
| 2013/0077361 | A1 | 3/2013 | Low et al. | |
| 2013/0293189 | A1 | 11/2013 | Low et al. | |
| 2014/0028107 | A1* | 1/2014 | Kwon | H01F 38/14 307/104 |
| 2014/0354223 | A1* | 12/2014 | Lee | H02J 5/005 320/108 |
| 2016/0359607 | A1* | 12/2016 | Bojer | H04B 1/0057 |

OTHER PUBLICATIONS

International Search Report and Written Opinion—PCT/US2016/047679—ISA/EPO—dated Nov. 21, 2016.

* cited by examiner

RECTIFIERS FOR WIRELESS POWER TRANSFER WITH IMPEDANCE INVERTING FILTERS FOR REDUCED ELECTROMAGNETIC INTERFERENCE

TECHNICAL FIELD

The described technology generally relates to wireless power. More specifically, the disclosure is directed to devices, systems, and methods related to the receiving of wireless power by a wireless power charging system.

BACKGROUND

In wireless power applications, wireless power charging systems may provide the ability to charge and/or power electronic devices without physical, electrical connections, thus reducing the number of components required for operation of the electronic devices and simplifying the use of the electronic device. Such wireless power charging systems may comprise a transmitter coupler and other transmitting circuitry configured to generate a magnetic field that may induce a current in a receiver coupler that may be connected to the electronic device to be charged or powered wirelessly. Similarly, the electronic devices may comprise a receiver coupler and other receiving circuitry configured to generate a current when exposed to a magnetic field. The receiving circuitry includes rectifiers that use diodes, transistors, or other nonlinear devices to convert RF or AC signals to DC. This has the undesirable characteristic of creating harmonics that may radiate out from the receiver coupler, for example, that can interfere with nearby communication systems. Regulations place strict limits on many of these harmonics. In addition to regulations, mobile phones, tablets and laptops have communication systems that experience interference and reduced performance due to these harmonics. Consequently, there is an ongoing need to improve the efficiency of performing wireless power transfer while reducing the amount of such interference.

SUMMARY

The embodiments disclosed herein each have several innovative aspects, no single one of which is solely responsible for the desirable attributes of the invention. Without limiting the scope, as expressed by the claims that follow, the more prominent features will be briefly disclosed here. After considering this discussion, one will understand how the features of the various embodiments provide several advantages over current wireless charging systems.

In one set of aspects, a receive circuit for wireless transfer of power includes a receive coupler that includes a resonant circuit including a receive inductor and a first capacitor through which the receive inductor is connected to a first node. A first pi filter is connected between the first node and an intermediate node, a second pi filter is connected between the intermediate node and a second node, and a rectifier through which the second node is connectable to drive a load. The first pi filter includes a second capacitance connected between the first node and ground, a third capacitance connected between the intermediate node and ground, and a first inductance connected between the first node and the intermediate node, wherein the impedances of the second capacitance, the third capacitance, and the first inductance are formed to provide a first impedance inversion function for the first pi filter such that the impedance at the first node varies inversely with the impedance at the intermediate node in a first frequency band. The second pi filter includes a fourth capacitance connected between the intermediate node and ground, a fifth capacitance connected between the second node and ground, and a second inductance connected between the intermediate node and the second node, wherein the impedances of the fourth capacitance, the fifth capacitance, and the second inductance are formed to provide a second impedance inversion function for the second pi filter such that the impedance at the intermediate node varies inversely with the impedance at the second node in the first frequency band.

In other aspects, a receive circuit for wireless transfer of power includes a receive coupler including a first receive inductor connected to a first node, a first capacitance connected between the first node and ground, a pi filter connected between the first node and a second node, and a rectifier through which the second node is connectable to drive a load. A resonant loop and the first capacitance are formed to have substantially equal but opposite reactances in a first frequency band. The pi filter is connected between the first node and a second node, including a second capacitance connected between the first node and ground, a third capacitance connected between the second node and ground, and a first inductance connected between the first node and the second node, wherein the impedances of the second capacitance, the third capacitance, and the first inductance are formed to provide an impedance inversion function for the first pi filter such that the impedance at the first node varies inversely with the impedance at the second node in the first frequency band.

In further aspects, a receive circuit for wireless transfer of power includes a receive coupler configured to wirelessly couple power via a wireless field. The receive coupler has a receive inductor, a rectifier connectable to drive a load, and first and second filtering means. The first filtering means is configured to provide a first impedance inversion function in a first frequency band and the second filtering means is configured to provide a second impedance inversion function in the first frequency band. The resonant loop is connected to the rectifier through the first and second filtering means connected in series.

In additional aspects a receive circuit for wireless transfer of power includes a receive coupler configured to inductively receive power via a magnetic field that has a frequency. The receive coupler includes a resonant circuit having an inductive loop electrically coupled in series to a capacitive element, the resonant circuit configured to resonate at the frequency of the magnetic field. The receive circuit also includes a rectifier electrically coupled to the receive coupler and configured to provide an output to power or charge a load; a first filter circuit electrically coupled between the receive coupler and the rectifier; and a second filter circuit electrically coupled between the first filter circuit and the rectifier. The first filter circuit has one or more first reactive elements with values such that the impedance of the first filter circuit as seen at the receive coupler varies inversely with the impedance of the second filter circuit, and the second filter circuit has one or more second reactive elements with values such that the impedance of the second filter circuit as seen at the first filter varies inversely with the impedance of the rectifier.

In a method for wirelessly transferring power, a receive coupler inductively receives power from a magnetic field having a frequency in a first frequency band, where the receive coupler includes a resonant circuit having an inductive loop electrically coupled in series to a capacitive element is configured to resonate for the first frequency band. The output of the receive coupler is supplied through a first filter circuit to a second filter circuit, and from the second filter circuit to a rectifier. The first filter circuit has one or more first reactive elements with values such that the impedance of the first filter circuit as seen at the receive coupler varies inversely with the impedance of the second filter circuit, and the second filter circuit has one or more second reactive elements with values such that the impedance of the second filter circuit as seen at the first filter varies inversely with the impedance of the rectifier.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
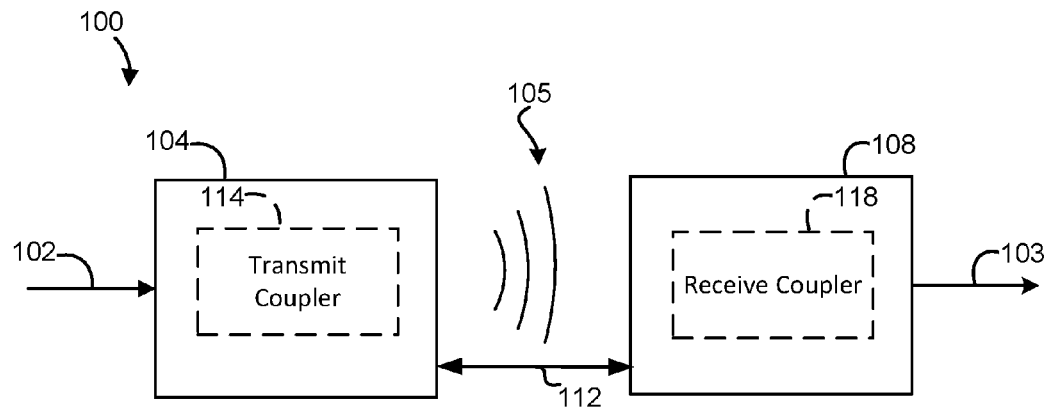
FIG. 1 is a functional block diagram of a wireless power transfer system, in accordance with one exemplary embodiment.

Various aspects of the novel systems, apparatuses, and methods are described more fully hereinafter with reference to the accompanying drawings. The teachings of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope of the following is intended to cover such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless power transfer technologies and system configurations, some of which are illustrated by way of example in the figures and in the following description of the preferred aspects. The detailed description and drawings are merely illustrative of the disclosure rather than limiting, the scope of the disclosure being defined by the appended claims and equivalents thereof.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

The terminology used herein is for the purpose of describing particular embodiments only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coupler" to achieve power transfer.

FIG. 1 is a functional block diagram of a wireless power transfer system 100, in accordance with one exemplary embodiment. Input power 102 is provided to a transmit coupler 114 of a transmitter 104 from a power source (not shown in this figure) to generate a wireless (e.g., magnetic or electromagnetic) field 105 for performing energy transfer. A receive coupler 118 of a receiver 108 (e.g., a cellular phone, a GPS unit, a watch, a mobile media device, a laptop computer, a key fob, or the like) couples to the wireless field 105 and generates an output power 103 for storing or consumption by a device (not shown in this figure) coupled to the output power 103. Both the transmitter 104 and the receiver 108 are separated by a distance 112.

The receiver 108 may wirelessly receive power when the receive coupler 118 is located in the wireless field 105 generated by the transmit coupler 114. The transmit coupler 114 of the transmitter 104 may transmit energy to the receive coupler 118 via the wireless field 105. The receive coupler 118 of the receiver 108 may receive or capture the energy transmitted from the transmitter 104 via the wireless field 105. The wireless field 105 corresponds to a region where energy output by the transmit coupler 114 may be captured by the receive coupler 118. In some embodiments, the wireless field 105 may correspond to the "near-field" of the transmitter 104. The "near-field" may correspond to a region in which there are strong reactive fields resulting from the currents and charges in the transmit coupler 114 that minimally radiate power away from the transmit coupler 114 in the far field. The near-field may correspond to a region that is within about one wavelength (or a fraction thereof) of the transmit coupler 114.

In one exemplary embodiment, the wireless field 105 may be a magnetic field and the transmit coupler 114 and the receive coupler 118 are configured to inductively transfer power. The transmit coupler and the receive coupler 118 may further be configured according to a mutual resonant relationship. When the resonant frequency of the receive coupler 118 and the resonant frequency of the transmit coupler 114 are substantially the same or very close, transmission losses between the transmitter 104 and the receiver 108 are reduced. Resonant inductive coupling techniques may thus allow for improved efficiency and power transfer over various distances and with a variety of coupler configurations. When configured according to a mutual resonant relationship, in an embodiment, the transmitter 104 outputs a time varying magnetic field with a frequency corresponding to the resonant frequency of the transmit coupler 114. When the receive coupler 118 is within the wireless field 105, the time varying magnetic field may induce a current in the receive coupler 118. When the receive coupler 118 is configured to resonate at the frequency of the transmit coupler 114, energy may be more efficiently transferred. The alternating current (AC) induced in the receive coupler 118 may be rectified to produce direct current (DC) that may be provided to charge or to power a load (not shown).

Figure 2:
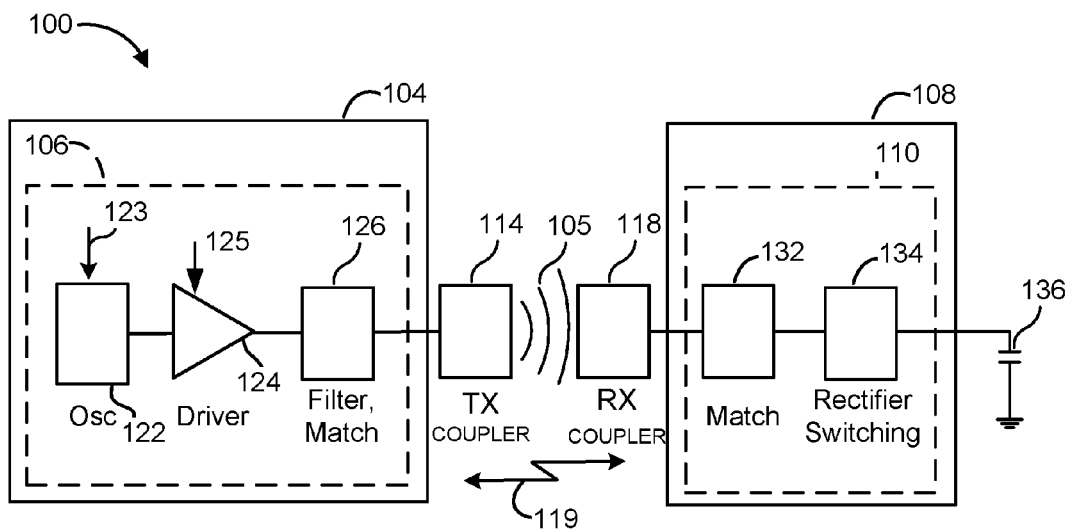
FIG. 2 is a functional block diagram of a wireless power transfer system, in accordance with another exemplary embodiment.

FIG. 2 is a functional block diagram of a wireless power transfer system 100, in accordance with an exemplary embodiment. The system 100 includes a transmitter 104 and a receiver 108. The transmitter 104 includes transmit circuitry 106 that includes an oscillator 122, a driver circuit 124, and a filter and matching circuit 126. The oscillator 122 may be configured to generate a signal at a desired frequency that is adjusted in response to a frequency control signal 123. The oscillator 122 provides the oscillator signal to the driver circuit 124. The driver circuit 124 is configured to drive a transmit coupler 114 at, for example, a resonant frequency of the transmit coupler 114 based on an input voltage signal (VD) 125. The driver circuit 124 may be a switching amplifier configured to receive a square wave from the oscillator 122 and output a sine wave or square wave.

The filter and matching circuit 126 filters out harmonics or other unwanted frequencies and matches the impedance of the transmitter 104 to the impedance of the transmit coupler 114. The transmit coupler 114 may generate a wireless field 105 to wirelessly output power at a level sufficient for charging a battery 136.

The receiver 108 includes receive circuitry 110 that includes a matching circuit 132 and a rectifier circuit 134. The matching circuit 132 may match the impedance of the receive circuitry 110 to the impedance of the receive coupler 118. The rectifier circuit 134 may generate a direct current (DC) power output from an alternate current (AC) input to charge the battery 136. The receiver 108 and the transmitter 104 may additionally communicate on a separate communication channel 119 (e.g., Bluetooth, Zigbee, cellular, etc.). The receiver 108 and the transmitter 104 may alternatively communicate via in-band signaling using characteristics of the wireless field 105.

Figure 3:
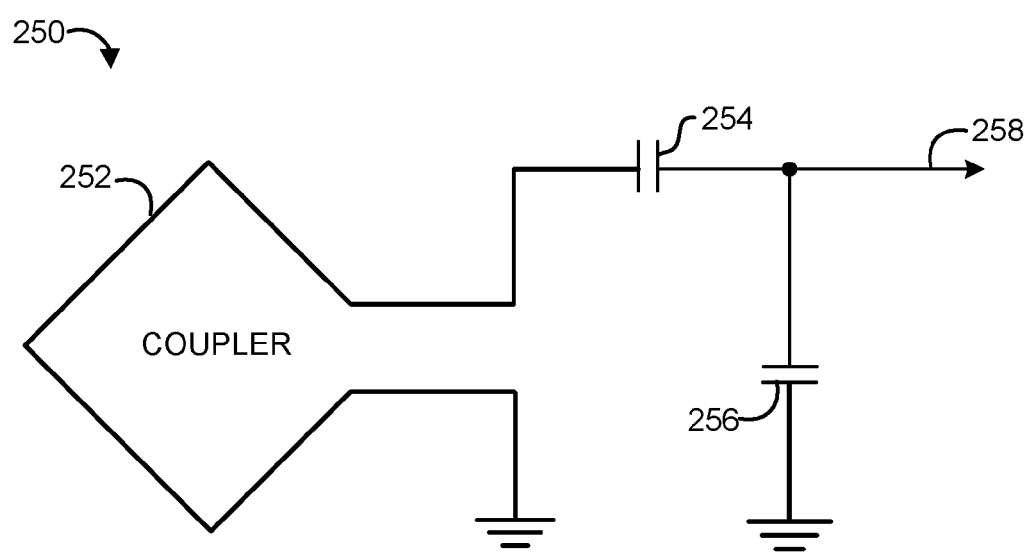
FIG. 3 is a schematic diagram of a portion of transmit circuitry or receive circuitry of FIG. 2 including a transmit or receive coupler, in accordance with exemplary embodiments.

FIG. 3 is a schematic diagram of a portion of transmit circuitry 106 or receive circuitry 110 of FIG. 2, in accordance with exemplary embodiments. As illustrated in FIG. 3, the transmit or receive circuitry 250 may include a coupler 252. The coupler 252 may also be referred to herein or be configured as a "magnetic" coupler, an antenna, or an induction coil. The term "coupler" generally refers to a component that wirelessly outputs or receives energy for coupling to another "coupler." The coupler 252 may also be referred to as a coil or inductor of a type that is configured to wirelessly output or receive power. As used herein, the coupler 252 is an example of a "power transfer component" of a type that is configured to wirelessly output and/or receive power. The coupler 252 may include an air core or a physical core such as a ferrite core (not shown in this figure).

The coupler 252 may form a portion of a resonant circuit configured to resonate at a resonant frequency. The resonant frequency of the coupler 252, which can be a loop coupler or magnetic coupler, is based on the inductance and capacitance. Inductance may be simply the inductance created by the coupler 252, whereas, a capacitor may be added to create a resonant structure at a desired resonant frequency. As a non-limiting example, a capacitor 254 and a capacitor 256 are added to the transmit or receive circuitry 250 to create a resonant circuit that resonates at a desired frequency of operation. Accordingly, for larger diameter couplers, the size of capacitance needed to sustain resonance may decrease as the diameter or inductance of the loop increases. Other resonant circuits formed using other components are also possible.

As another non-limiting example, a capacitor (not shown) may be placed in parallel between the two terminals of the circuitry 250. For transmit couplers, a signal 258, with a frequency that substantially corresponds to the resonant frequency of the coupler 252, may be an input to the coupler 252. For receive couplers, the signal 258, with a frequency that substantially corresponds to the resonant frequency of the coupler 252, may be an output from the coupler 252.

Figure 4:
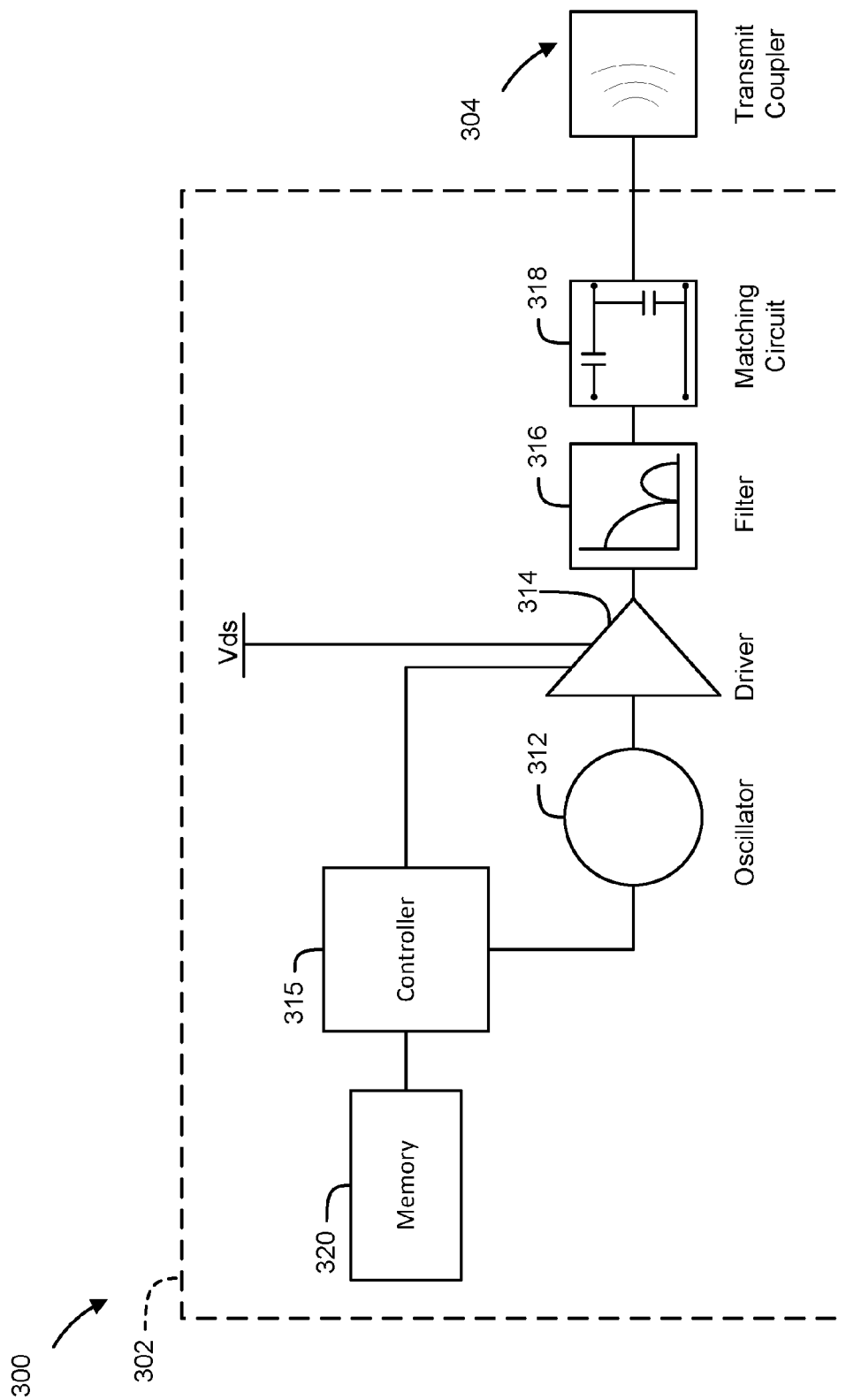
FIG. 4 is a simplified functional block diagram of a transmitter that may be used in an inductive power transfer system, in accordance with exemplary embodiments.

FIG. 4 is a simplified functional block diagram of a transmitter 300 that may be used in an inductive power transfer system, in accordance with exemplary embodiments. The transmitter 300 includes transmit circuitry 302 and a transmit coupler 304 operably coupled to the transmit circuitry 302. In some embodiments, the transmit coupler 304 is configured as the transmit coupler 114 as described above in reference to FIG. 2. In some embodiments, the transmit coupler 304 is or may be referred to as a coil (e.g., an induction coil). In an exemplary embodiment, the transmit coupler 304 is configured to generate an electromagnetic or magnetic field within a charging region. In an exemplary embodiment, the transmit coupler 304 is configured to transmit power to a receiver device within the charging region at a power level sufficient to charge or power the receiver device.

The transmit circuitry 302 may receive power through a number of power sources (not shown). The transmit circuitry 302 may include various components configured to drive the transmit coupler 304. In some exemplary embodiments, the transmit circuitry 302 may be configured to adjust the transmission of wireless power based on the presence and constitution of the receiver devices as described herein. As such, the transmit circuitry 302 may provide wireless power efficiently and safely.

The transmit circuitry 302 includes a controller 315. In some embodiments, the controller 315 may be a microcontroller or a processor. In other embodiments, the controller 315 may be implemented as an application-specific integrated circuit (ASIC). The controller 315 may be operably connected, directly or indirectly, to each component of the transmit circuitry 302. The controller 315 may be further configured to receive information from each of the components of the transmit circuitry 302 and perform calculations based on the received information. The controller 315 may be configured to generate control signals for each of the components that may adjust the operation of that component. As such, the controller 315 may be configured to adjust the power transfer based on a result of the calculations performed by it.

The transmit circuitry 302 may further include a memory 320 operably connected to the controller 315. The memory 320 may comprise random-access memory (RAM), electrically erasable programmable read only memory (EEPROM), flash memory, or non-volatile RAM. The memory 320 may be configured to temporarily or permanently store data for use in read and write operations performed by the controller 315. For example, the memory 320 may be configured to store data generated as a result of the calculations of the controller 315. As such, the memory 320 allows the controller 315 to adjust the transmit circuitry 302 based on changes in the data over time.

The transmit circuitry 302 may further include an oscillator 312 operably connected to the controller 315. In some embodiments, the oscillator 312 is configured as the oscillator 122 as described above in reference to FIG. 2. The oscillator 312 may be configured to generate an oscillating signal at the operating frequency of the wireless power transfer. For example, in some exemplary embodiments, the oscillator 312 is configured to operate at the 6.78 MHz ISM frequency band. The controller 315 may be configured to selectively enable the oscillator 312 during a transmit phase (or duty cycle). The controller 315 may be further configured to adjust the frequency or a phase of the oscillator 312 which may reduce out-of-band emissions, especially when transitioning from one frequency to another. As described above, the transmit circuitry 302 may be configured to provide an amount of charging power to the transmit coupler 304, which may generate energy (e.g., magnetic flux) about the transmit coupler 304.

The transmit circuitry 302 further includes a driver circuit 314 operably connected to the controller 315 and the oscillator 312. The driver circuit 314 may be configured as the driver circuit 124 as described above in reference to FIG. 2. The driver circuit 314 may be configured to drive the signals received from the oscillator 312, as described above.

The transmit circuitry 302 may further include a low pass filter 316 operably connected to the transmit coupler 304. The low pass filter 316 may be configured as the filter portion of the filter and matching circuit 126 as described above in reference to FIG. 2. In some exemplary embodiments, the low pass filter 316 may be configured to receive and filter an analog signal of current and an analog signal of voltage generated by the driver circuit 314. In some embodiments, the low pass filter 316 may alter a phase of the analog signals. The low pass filter 316 may cause the same amount of phase change for both the current and the voltage, canceling out the changes. In some embodiments, the controller 315 may be configured to compensate for the phase change caused by the low pass filter 316. The low pass filter 316 may be configured to reduce harmonic emissions to levels that may prevent self-jamming. Other exemplary embodiments may include different filter topologies, such as notch filters that attenuate specific frequencies while passing others.

The transmit circuitry 302 may further include a fixed impedance matching circuit 318 operably connected to the low pass filter 316 and the transmit coupler 304. The fixed impedance matching circuit 318 may be configured as the matching portion of the filter and matching circuit 126 as described above in reference to FIG. 2. The fixed impedance matching circuit 318 may be configured to match the impedance of the transmit circuitry 302 (e.g., 50 ohms) to the impedance of the transmit coupler 304. Other exemplary embodiments may include an adaptive impedance match that may be varied based on measurable transmit metrics, such as the measured output power to the transmit coupler 304 or a DC current of the driver circuit 314.

The transmit circuitry 302 may further comprise discrete devices, discrete circuits, and/or an integrated assembly of components.

Transmit coupler 304 may be implemented as an antenna strip with the thickness, width and metal type selected to keep resistive losses low. In one embodiment, the transmit coupler 304 can generally be configured for association with a larger structure such as a table, mat, lamp or other less portable configuration. In an exemplary application where the transmit coupler 304 may be larger in size relative to the receive coupler, the transmit coupler 304 will not necessarily need a large number of turns to obtain a reasonable inductance to form a portion of a resonant circuit tuned to a desired operating frequency.

Figure 5:
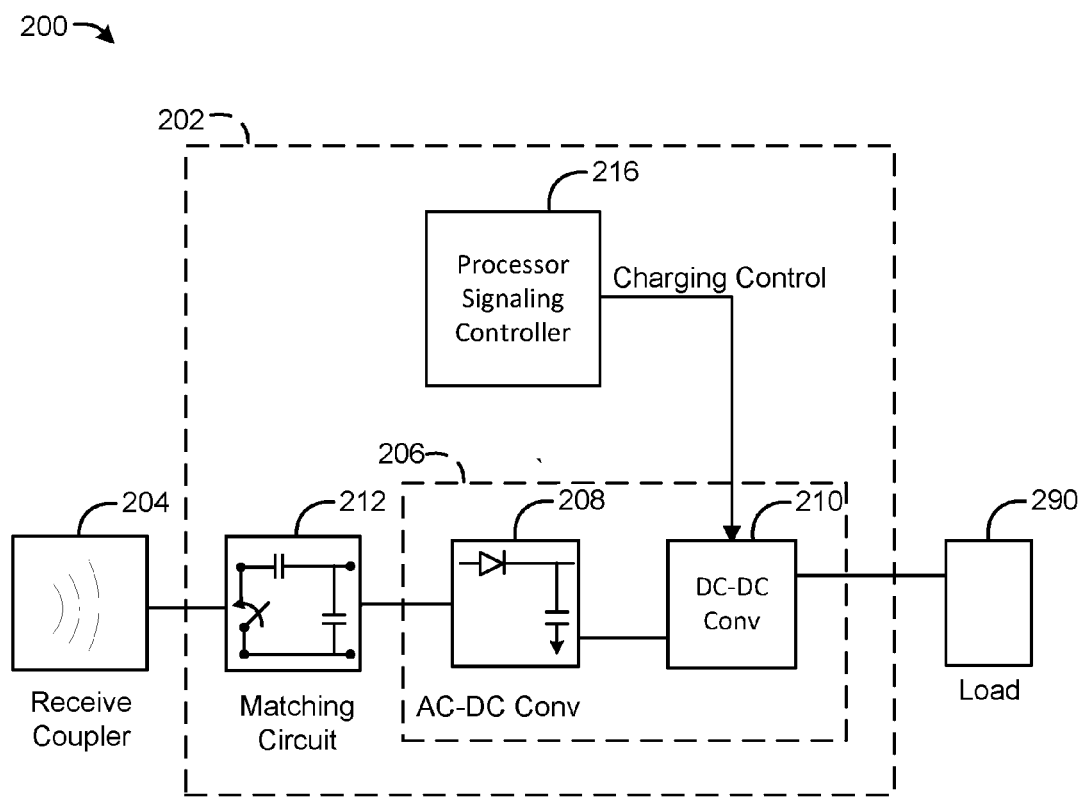
FIG. 5 is a simplified functional block diagram of a receiver that may be used in the inductive power transfer system, in accordance with exemplary embodiments.

FIG. 5 is an exemplary block diagram of a receiver 200 that may be used in the inductive power transfer system, in accordance with an embodiment. A receiver 200 includes a receive circuitry 202, a receive coupler 204, and a load 290. The receive circuitry 202 is electrically coupled to the load 290 for providing received charging power thereto. It should be noted that receiver 200 is illustrated as being external to load 290 but may be integrated into load 290. The receive coupler 204 is operably connected to the receive circuitry 202. The receive coupler 204 may be configured as the receive coupler 118 as described above in reference to FIG. 2. In some embodiments, the receive coupler 204 may be tuned to resonate at a frequency similar to a resonant frequency of the transmit coupler 304, or within a specified range of frequencies, as described above. The receive coupler 204 may be similarly dimensioned with transmit coupler 304 or may be differently sized based upon the dimensions of the load 290. The receive coupler 204 may be configured to couple to the magnetic field generated by the transmit coupler 304, as described above, and provide an amount of received energy to the receive circuitry 202 to power or charge the load 290.

The receive circuitry 202 is operably coupled to the receive coupler 204 and the load 290. The receive circuitry 202 may be configured as the receive circuitry 110 as described above in reference to FIG. 2. The impedance presented to the receive coupler 204 by the receive circuitry 202 may be configured to match an impedance of the receive coupler 204 (e.g., via a matching circuit schematically represented at 212), which may increase efficiency. The receive circuitry 202 may be configured to generate power based on the energy received from the receive coupler 204. The receive circuitry 202 may be configured to provide the generated power to the load 290. In some embodiments, the receiver 200 may be configured to transmit a signal to the transmitter 300 indicating an amount of power received from the transmitter 300.

The receive circuitry 202 includes a processor-signaling controller 216 configured to coordinate the processes of the receiver 200.

The receive circuitry 202 includes power conversion circuitry 206 for converting a received energy source into charging power for use by the load 290. The power conversion circuitry 206 includes an AC-to-DC converter 208 coupled to a DC-to-DC converter 210. The AC-to-DC converter 208 rectifies the AC signal from the receive coupler 204 into DC power while the DC-to-DC converter 210 converts the rectified energy signal into an energy potential (e.g., voltage) that is compatible with the load 290. Various AC-to-DC converters 208 are contemplated including partial and full rectifiers, regulators, bridges, doublers, as well as linear and switching converters.

The receive circuitry 202 may further include the matching circuit 212 configured to connect the receive coupler 204 to the power conversion circuitry 206 or alternatively for disconnecting the power conversion circuitry 206 from the receive coupler 204. Disconnecting the receive coupler 204 from the power conversion circuitry 206 may not only suspend charging of the load 290, but also changes the "load" as "seen" by the transmitter 300 (FIG. 4) as is explained more fully below.

Resonant Rectifiers

Considering the receive circuitry 202 further, the following considers rectifier topologies (e.g., forming at least a portion of the AC-to-DC converter 208 of FIG. 5) and methods to tune the rectifier so that it performs from an electromagnetic interference (EMI) point of view, while maintaining the sort of voltage regulation at the output that a series tuned rectifier would maintain. Approaches to EMI filters may add "shunt tuning", making voltage regulation more problematic. The filters described below use mostly ideal inductors and capacitors to greatly simplify the math needed to understand the filters.

Rectifiers use diodes, transistors, or other nonlinear devices to convert RF or AC signals to DC. This has the undesirable characteristic of creating harmonics that can interfere with nearby communication systems. Regulations place strict limits on many of these harmonics. In addition to regulations, mobile phones, tablets and laptops have communication systems that experience interference and reduced performance due to these harmonics. EMI filter topologies may use methods such as band stop filters, low pass filters and other methods that may be complex and may increase the complexity of voltage regulation, and may also present undesirable reflected impedances to the transmitter 300 (FIG. 4).

The voltage at the output of a wireless power receiver 200 is desirably kept in as narrow of a range as practical, as a narrower range makes the DC to DC converter needed in the wireless power receiver more compact, efficient, and less costly (or potentially even unnecessary). The induced voltage in the receive coupler coil is a function of the mutual inductance of the coil times the transmitter current. A series resonant filter delivers a voltage to the input of the rectifier that is close as possible to the induced voltage.

Figure 6A:
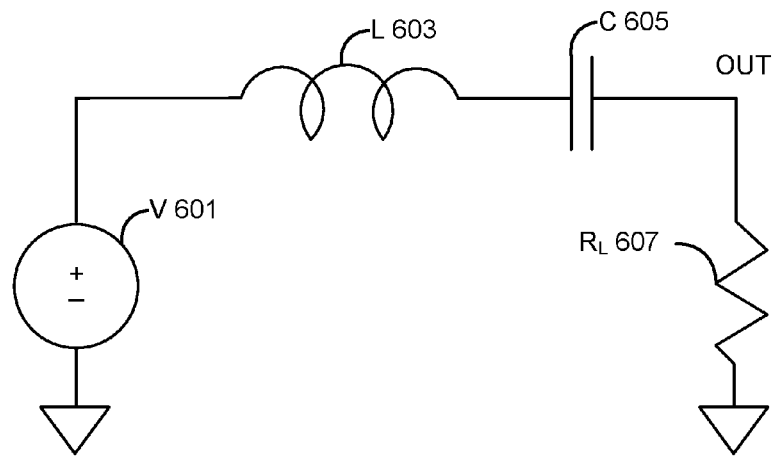
FIG. 6A illustrates a simple series tuned filter.
Figure 6B:
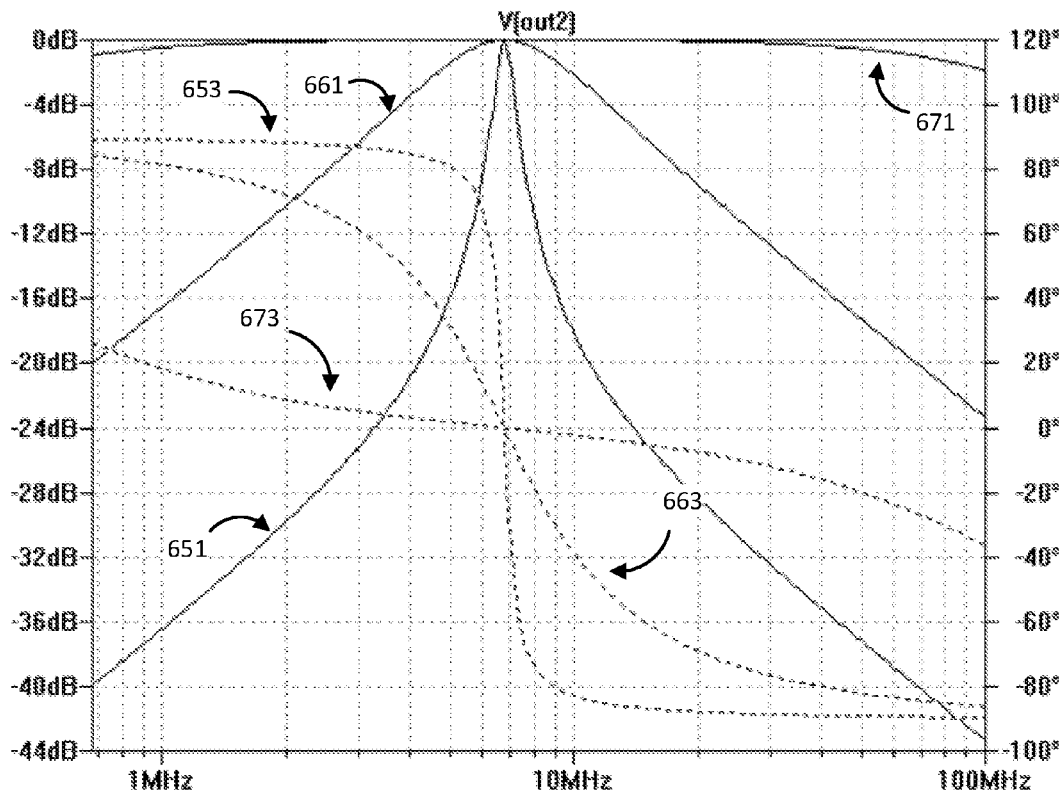
FIG. 6B shows the AC behavior of the circuit of FIG. 6A.

FIG. 6A represents such a series tuned circuit that represents a wireless power receiver in a simplified form. The voltage source V 601 corresponds to the receive coupler coil, where the value of V is equal to w (number of coil windings) times M (mutual inductance) times Itx (transmitter coil current). L 603 represents the resonator total inductance. C 605 represents a capacitance chosen to have a substantially equal and opposite reactance to L 603 at the relevant frequency band, such as the 6.78 MHz ISM frequency band (to form a resonant circuit). $R_L$ 607 represents the load. The variation in the voltage at OUT is limited to the variation in M, Itx, and the voltage lost in the resistance of L 603. FIG. 6B is an AC analysis of the circuit of FIG. 6A and shows that the attenuation of harmonics is best with a heavy load (small load resistor $R_L$ 607 value). The traces 651, 653 are the attenuation, phase for 5 ohms, the traces 661, 663 are the attenuation, phase for 50 ohms, and the traces 671, 673 are the attenuation, phase for 1K ohms. Since the creation of harmonics increases with load, the net effect is that harmonics tends to be worse at higher load levels. An AC analysis of FIG. 6A also shows that there is no attenuation or voltage gain for this circuit regardless of load at the relevant frequency (where the capacitance and inductance have substantially equal and opposite reactances), which is an ideal characteristic in such a circuit.

Figure 7A:
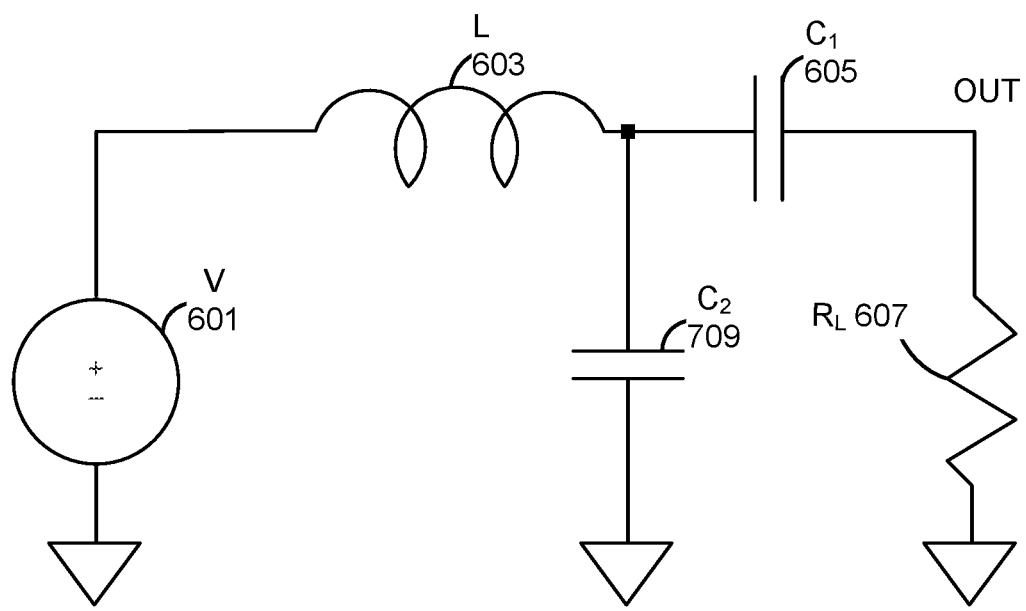
FIG. 7A illustrates a wireless power receiver with shunt and series tuning.
Figure 7B:
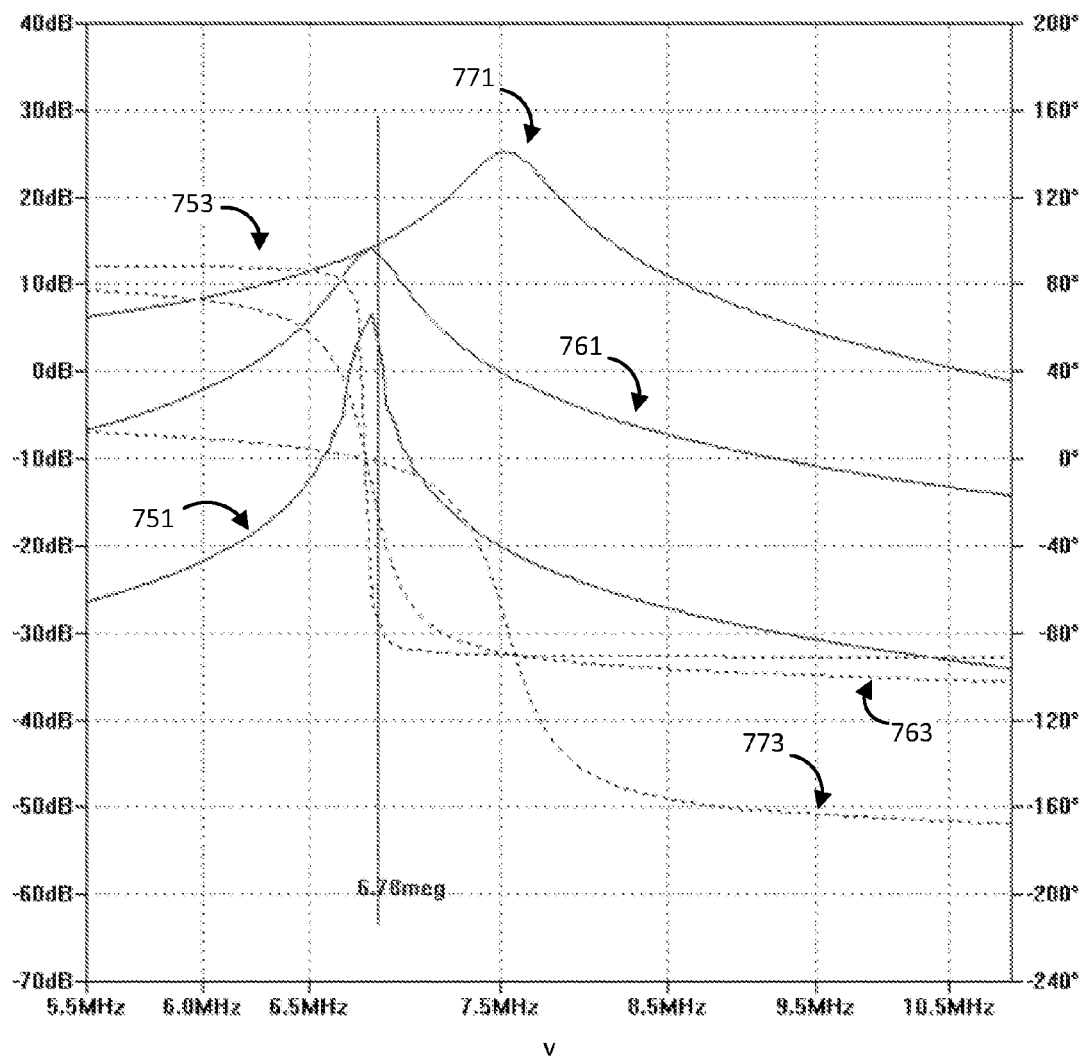
FIG. 7B shows the AC behavior of the circuit of FIG. 7A.

The addition of shunt tuning makes the voltage regulation potentially more complicated. FIG. 7A shows a wireless power receiver, where the elements corresponding to those of FIG. 6A being numbered the same and where the shunt tuning is represented by $C_2$ 709. The addition of shunt tuning changes the transfer function relative to the circuit of FIG. 6A, with an 8 db range in voltage from 5 ohms to 1K ohms, making voltage regulation at the receiver more difficult. This is illustrated in FIG. 7B, where the traces 751, 753 are the attenuation, phase for 5 ohms, the traces 761, 763 are the attenuation, phase for 50 ohms, and the traces 771, 773 are the attenuation, phase for 1K ohms. For this reason, EMI filtering could be used to minimize or eliminate shunt tuning. Unfortunately most methods of EMI control add shunt tuning.

Improved or less complicated voltage regulation in a wireless power receiver may be generally realized in one aspect via a series resonant topology, or a topology that has a fixed voltage transformation regardless of load. However, in some aspects it would be desirable for a topology to have significantly better EMI performance than a series resonant filter. Examples of topologies and methods of choosing component values are described below for some examples.

Figure 8A:
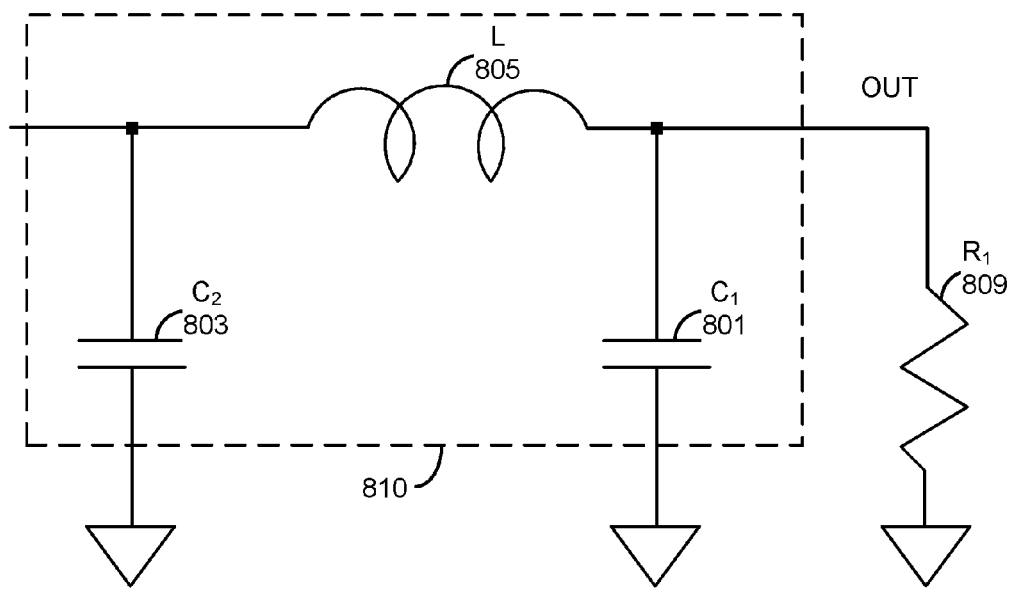
FIG. 8A is a schematic of a PI filter.
Figure 8B:
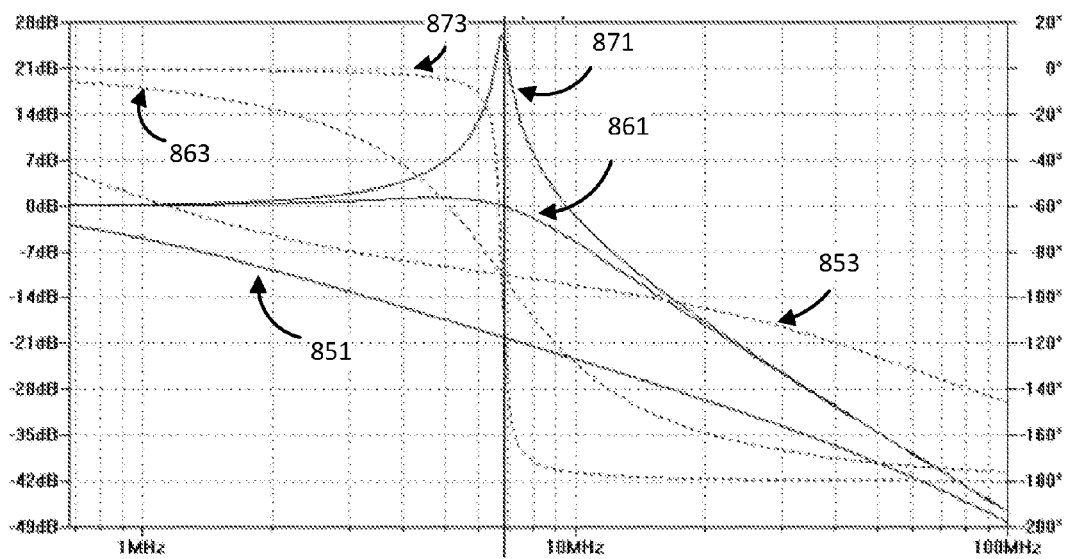
FIG. 8B shows the AC behavior of the circuit of FIG. 8A.

Use of a "pi" filter is one possible method of reducing EMI. This topology can reduce EMI in many circuits, but has what is usually the disadvantage of having shunt tuning resulting in more complicated voltage regulation. FIG. 8A illustrates a pi filter 810 with two capacitors $C_1$ 801 and $C_2$ 803, configured to have the same impedance $X_C$, and one inductor L 805 with impedance $X_L$. When that capacitive reactance is equal to the inductive reactance and similar to the rectifier load impedance (here $R_L$ 809), an undesirable characteristic of the pi filter may occur. The input impedance is equal to $X_C * X_L/R_L$, a result known as an impedance inversion. As long as RL is real, the input impedance is real. When the load $R_L$ is the same as $X_C$ and $X_L$, the input impedance is equal to the load impedance; but as the load impedance is decreased, the input impedance increases. Due to impedance inversion, if the rectifier is lightly loaded, $R_L$ goes to high impedance with the undesirable result that the output voltage goes out of control. There is, however, the desirable effect of this filter that it gives at least, for example, an 18 db attenuation of the $3^{rd}$ harmonic and causes a very sharp attenuation of higher order harmonics. FIG. 8B shows the frequency response of FIG. 8A, where 851, 853 are the attenuation, phase for 5 ohms; 861, 863 are the attenuation, phase for 50 ohms; and 871, 873 are the attenuation, phase for 1K ohms.

Figure 9A:
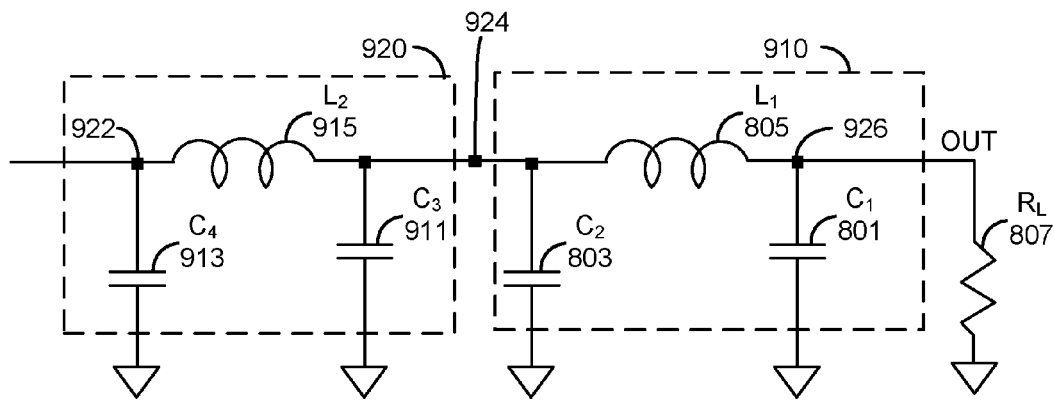
FIG. 9A is an embodiment of a double impedance inversion filter.

If the pi filter 810 of FIG. 8A is cascaded with another such pi filter as in FIG. 9A, where a first pi filter 910 is connected between an intermediate node 924 and a second node 926, and a second pi filter 920 is connected between the intermediate node 924 and a first node 922 the impedance is inverted twice, restoring the load impedance at the input of the filter. In FIG. 9A, the first pi filter 910 and load are numbered as in FIG. 8A and the second pi filter 920 is $C_3$ 911, $C_4$ 913, and $L_2$ 915. In this example, the capacitances $C_2$ and $C_3$ are shown being implemented as two separate capacitors, but can be lumped into a single capacitor; and in this example $X_{C4}$, $X_{L2}$, $X_{C3}$, $X_{C2}$, $X_{L1}$, and $X_{C1}$ are configured such that the impedance of each capacitive and inductive element is the same at the exemplary frequency of 6.78 MHz.

Figure 9B:
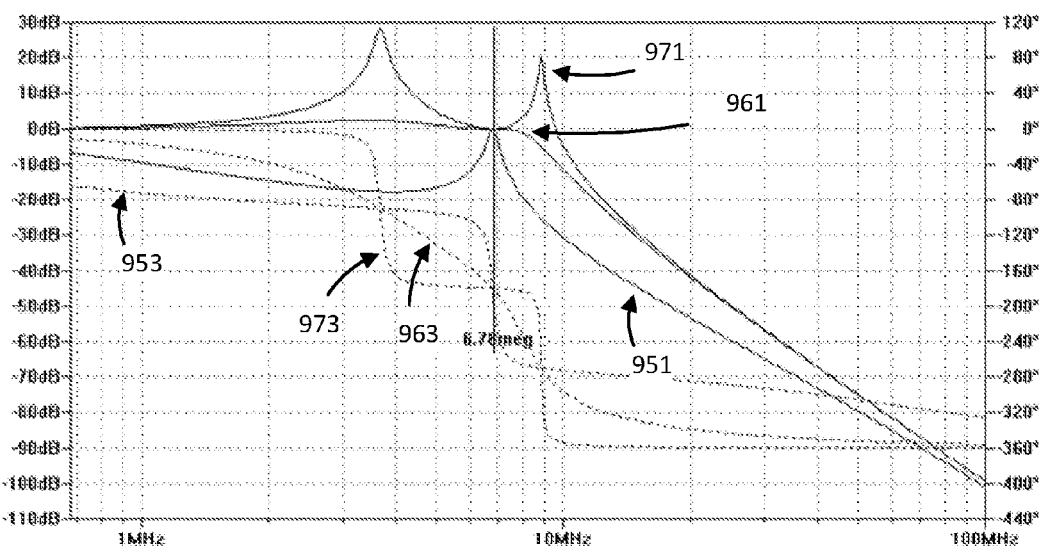
FIG. 9B illustrates the frequency response of a double impedance inversion filter.

FIG. 9B illustrates the frequency response of a double impedance inversion filter, where 951 and 953 are respectively the attenuation and phase for 5 ohms; the traces 961 and 963 are respectively the attenuation and phase for 50 ohms; and 971 and 973 are respectively the attenuation and phase for 1K ohms. The resultant double impedance inversion results in a filter that looks like a wire at 6.78 MHz, regardless of load impedance. At the harmonics however, the filter has very sharp attenuation. There is an attenuation of 42 db at the $3^{rd}$ harmonic, while at 6.78 MHz, there is no attenuation.

A first set of embodiments use a filter as in FIG. 9A where the capacitors and inductors are configured, or formed such that $X_{C4}=X_{L2}=X_{C3}$ and $X_{C2}=X_{L1}=X_{C1}$ at the exemplary 6.78 MHz ISM frequency band, and simplified variants thereof. As noted above, $C_2$ 803 and $C_3$ 911 can be combined in an actual circuit to a single capacitor, but they are shown separate to simplify the explanation of the circuit. By changing the ratio of the reactance of the cascaded pi filters, an impedance transformation can be made. In FIG. 9A, if $X_{C4}=X_{L2}=X_{C3}$ and $X_{C2}=X_{L1}=X_{C1}$ then the following equation can be used to transform the load impedance:

$$Zin=(X_{L2}/X_{L1})^2 * RL.$$

This property can be useful for better matching resonators to the desired rectifier voltage. The above equation also works if the load is complex instead of purely resistive.

Figure 10:
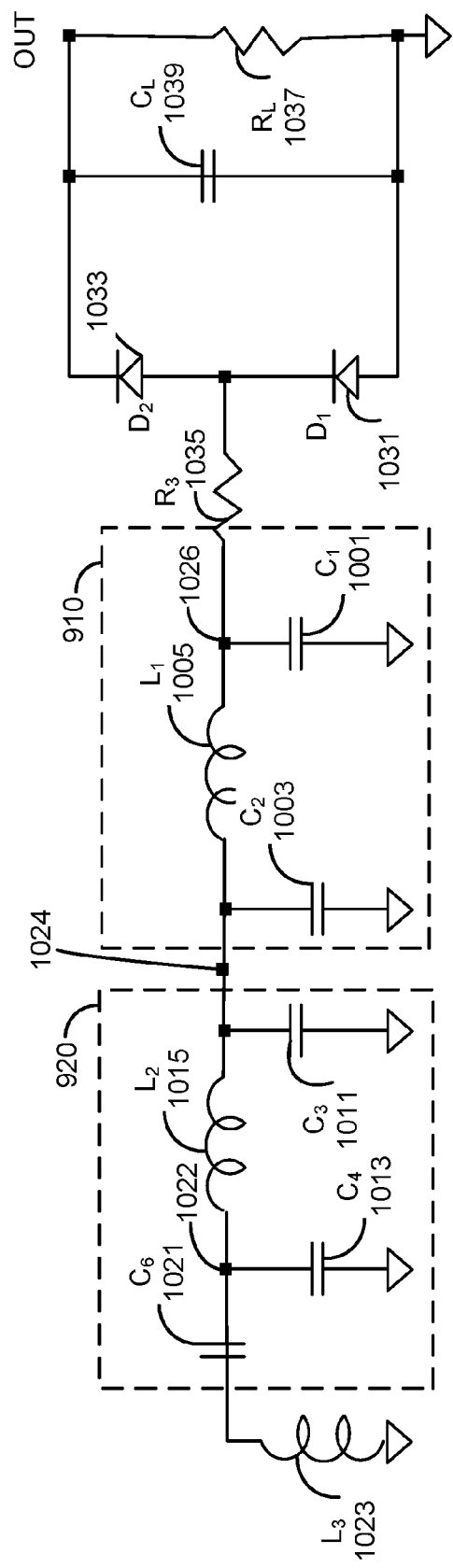
FIG. 10 shows an embodiment of a resonant voltage doubler rectifier with resonant coupler and separate double impedance inversion.

FIG. 10 shows a double inversion filter incorporated into a wireless power receiver. The pi filters 910 and 920 are coupled to the first node 1022, intermediate node 1024 and second node 1026, are labelled as in FIG. 9A and the load resistance and smoothing capacitance are respectively shown as $R_L$ 1037 and $C_L$ 1039. The shown rectifier is of the voltage doubler type and is formed here from the diodes $D_1$ 1031 and $D_2$ 1033, with an input resistance $R_3$ 1035, but other rectifier topologies can be used. The receive coupler of the series resonance of $C_6$ 1021 and the inductor or resonant loop of inductor $L_3$ 1023 (e.g., to form receive coupler) further attenuate the harmonics from the rectifier. An additional double inversion filter can be used along with two additional diodes to make a full bridge rectifier with a differential input, as in the embodiment of FIG. 13 below.

The embodiment of FIG. 10 uses a number of components, including the inductances $L_1$ 1005 and $L_2$ 1015 that can be physically large and lossy due to the resonant currents in the inductor. The attenuation of the harmonics may also be better than it needs to be. The circuitry can be modeled as a voltage source in series with an inductor with a loss resistance. For one, the inductance $L_2$ 1015 is replaced with the inductance of the receive coupler. $C_4$ 1013 can be placed in parallel with the voltage source of the modeled receive coupler, where, since an ideal voltage source has zero impedance, $C_4$ 1013 can be eliminated. For $C_3$ 1011 of FIG. 10, the reactance can be chosen to be substantially equal and opposite of the coupler's reactance at the relevant frequency band. The values for $C_2$ 1003, $L_1$ 1005, and $C_1$ 1001 can be chosen to get the desired impedance transformation of the rectifier input impedance. For example, the reactance $X_{L1}$ may be equal or similar in size to $X_L$ for the coupler's resonant loop (receive inductor $L_3$ 1023 of the resonant coupler).

Figure 11:
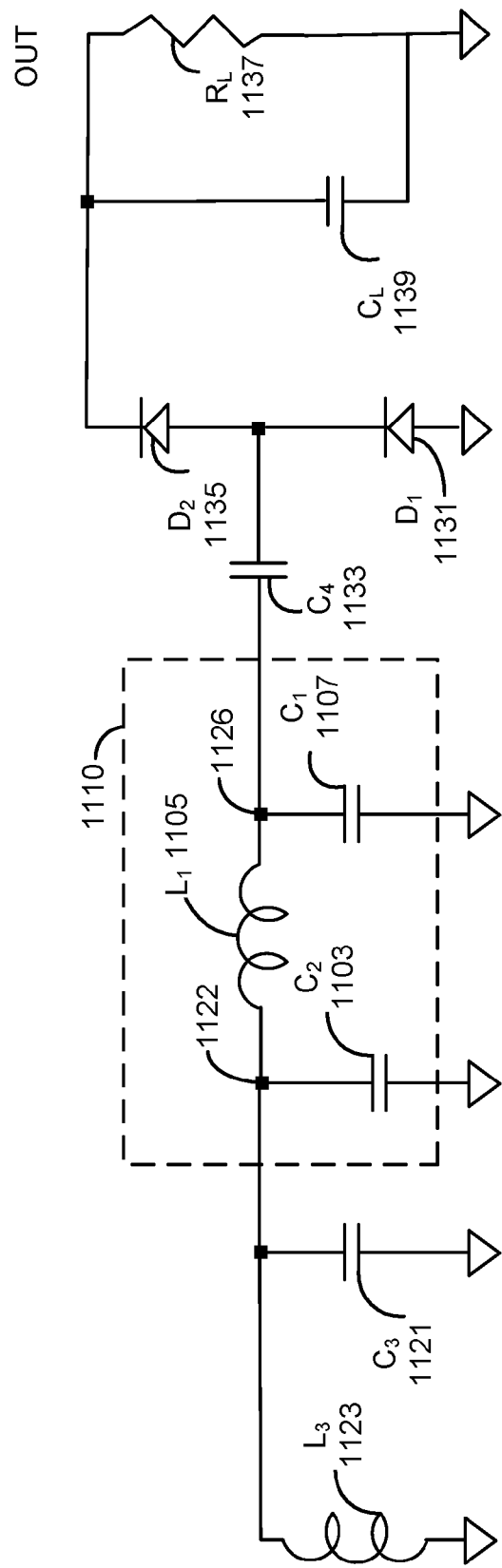
FIG. 11 shows an embodiment of a resonant voltage doubler using coupler inductance to provide first impedance inversion.

The resultant double impedance inversion using coupler inductance circuit is illustrated in FIG. 11. A loop (or coupler or "antenna") $L_3$ 1123 receives wireless power with a coupled voltage and inductance of Lant. A resonant capacitor $C_3$ 1121 in parallel to ground has a reactance of similar or equal magnitude to that of the coupler reactance. $X_{L3} \approx X_{C3}$. This parallel combination of coupled inductance creates an approximate current source. Relative to FIG. 10, in FIG. 11 the series resonant tank is gone, and the coupler replaces the first inductor. An impedance inversion stage is formed from the pi filter 1110 of $C_2$ 1103, $L_1$ 1105, and $C_1$ 1107. The pi filter 1110 is coupled between a first node 1122 and a second node 1126. This impedance inversion converts the current source of $L_3 \| C_3$ into a voltage source into the rectifier. Values of $C_2$ 1103, $L_1$ 1105, and $C_1$ 1107 can be chosen so that the reactance of all 3 elements is the same in the appropriate frequency band. Values are likely to be adjusted to compensate for the rectifier reactance at a given DC load ($R_L$ 1137). The impedance inversion stage of the pi filter 1110 significantly attenuates harmonics in addition to inverting impedance at the fundamental. An optional DC blocking capacitor $C_4$ 1133 may or may not be included depending on the rectifier topology. In this embodiment, the rectifier with diodes $D_1$ 1131 and $D_2$ 1135 is again a voltage doubler, as in FIG. 10, connected to the load $R_L$ 1137 and capacitor $C_L$ 1139, and a capacitor $C_4$ 1133 is included.

Rectifiers may not have real load impedance, even if the diodes used have zero capacitance, but have a reactance and resistance that varies depending on the load impedance. Since the rectifier is a source of harmonics, the impedance of the rectifier is also dependent on the source impedance at the harmonic frequencies. If the source impedance is high at the $3^{rd}$ harmonic, the rectifier tends to look more real, while if the source impedance is low at the $3^{rd}$ harmonic, the rectifier looks more capacitive. The filters shown so far further involve a decision on the reactance of the elements in the filter network. In a filter where capacitive and inductive reactance are taken as substantially equal, raising the reactance makes the filter have a higher impedance at the $3^{rd}$ harmonic, while decreasing the reactance causes a lower impedance at the $3^{rd}$ harmonic. Since the inductor used is likely to be more difficult to find in a practical size and loss levels, a practical starting point for inductor size is where the reactance is equal to 2 times the magnitude of the rectifier input impedance at the maximum power point. If the reactance is less than this, the rectifier current will be discontinuous over a large part of the operating range. The RMS current in the inductor gets higher as the reactance is decreased. There is little size benefit to decreasing the reactance to less than 2 times the load impedance since the higher peak current increases the need for energy storage within the inductor. Increasing the inductor value to 4 times the load impedance reduces the peak current, but increases the energy storage required by about 50%.

Once the inductor is chosen, the rectifier should be tuned to compensate for the rectifier input impedance at maximum power. After the rectifier is tuned for maximum power it should be verified that output voltage stays under control under very light loading conditions. Some range of tuning can be accomplished by adjusting the capacitor in parallel with the input of the rectifier. In many practical embodiments, some or all of the inductances and capacitances will be separate components relative to the integrated circuit chips, as their values, voltage ratings and other factors often make them difficult or impractical to integrate onto silicon.

For simplification, in the rectifier examples discussed below, the inductance of the inductor of the receive coupler is represented by Lant and the resonant capacitor is represented by Cant. Inductive reactance of Lant is taken to be close to the capacitive reactance of Cant. The filter components L and C are chosen so that the reactance of L and C is close to equal. The capacitor closest to the diodes can be split into two capacitors, with each one directly in parallel with each diode. Since rectifiers of FIGS. 10 and 11 is basically an AC ground, having half the capacitance across each diode is basically the same as having all of the capacitance going to ground.

The schematics of many of the figures show capacitors in parallel. This is done for clarity on how the values are calculated. The parallel capacitors may be replaced by a single capacitor, so that two parallel capacitances may be implemented as a single capacitor or two actual capacitors.

The voltage doubler type of rectifier of FIGS. 10 and 11 is a simple type of rectifier that can use this resonant topology. Having a single ended input simplifies the circuit. Note that a smaller value for $C_1$ 1001 (FIG. 10) may be used to compensate for the rectifier input reactance.

In some of the rectifier variants, a DC blocking capacitor may be inserted to break a DC path through series inductors. In cases where this capacitor is used, it may be located anywhere in the series path. In FIG. 10 the DC block is performed by $C_6$ 1021, which also provides the required reactance.

Returning to FIGS. 10 and 11, the embodiment of FIG. 10 shows a resonant voltage doubler rectifier with resonant receive coupler formed from $L_3$ 1023 and $C_6$ 1021 and separate double impedance inversion, where the first impedance inversion is done by $C_4$ 1013, $L_2$ 1015, and $C_3$ 1011 and the second impedance inversion is done by $C_2$ 1003, $L_1$ 1005, and $C_1$ 1001. The resonator reactance is cancelled by $C_6$ 1021. The topology of FIG. 10 gives very good EMI performance, but has the complexity and likely physically large elements of $L_1$ 1005 and $L_2$ 1015. In FIG. 11, the resonant voltage doubler uses the inductance in the receive coupler to accomplish the first impedance inversion, performed by inductor $L_3$ 1123 and capacitance $C_3$ 1121 of the receive coupler, with the second impedance inversion performed by the pi filter 1110 of $C_2$ 1103, $C_1$ 1107, and $L_1$ 1105. As mentioned herein, the capacitances $C_3$ 1121 and $C_2$ 1103 can be implemented as a single capacitor or multiple capacitors. The topology of FIG. 11 is more compact than FIG. 10, but has less EMI suppression due to fewer filter stages.

Figure 12:
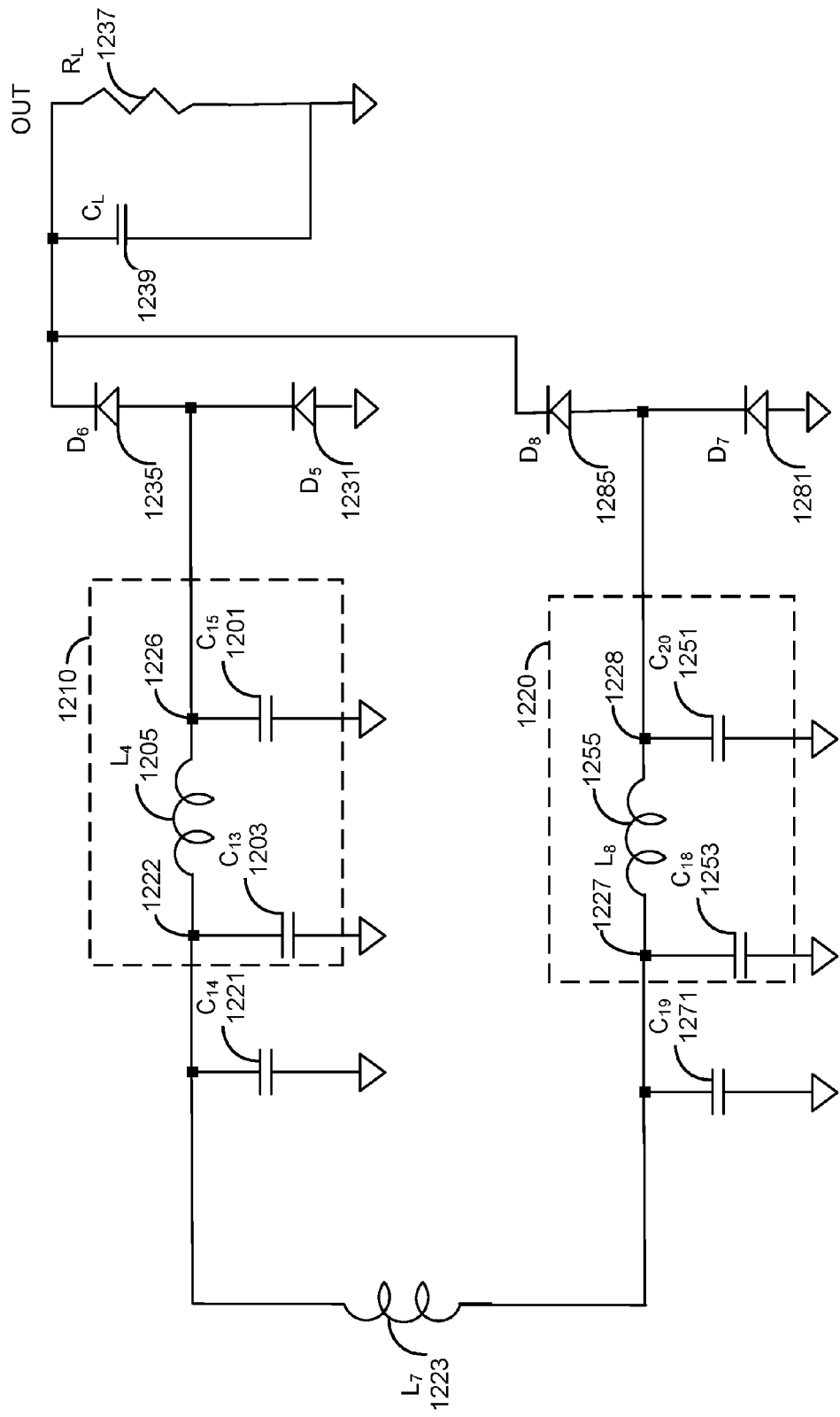
FIG. 12 is an embodiment of a full wave resonant bridge using coupler inductance for first impedance inversion.

FIG. 12 shows an embodiment as a full wave resonant bridge using inductance of the receive coupler for first impedance inversion, which can be thought of as two doublers connected to a differential coupler. The reactance Lant of the loop $L_7$ 1223 is doubled to match the series reactance of $C_{14}$ 1221 and $C_{19}$ 1271. The upper and lower pi filters 1210 and 1220 are coupled respectively between first node 1222 and second node 1226; and between third node 1227 and fourth node 1228 and are as before, where the capacitance $C_{15}$ 1201 may be split into two as two capacitors, with half across diode $D_5$ 1231 and the other across diode $D_6$ 1235. Similarly, $C_{20}$ 1251 may be split in two with half in parallel with $D_7$ 1281 and the other half in parallel with $D_8$ 1285. The capacitances $C_{13}$ 1203 and $C_{18}$ 1253 may respectively be lumped with $C_{14}$ 1221 and $C_{19}$ 1271. The capacitances $C_{15}$ 1201 and $C_{20}$ 1251 may be reduced in value to compensate for the rectifier input reactance at a given load (represented as $C_L$ 1239 and $R_L$ 1237). $L_4$ 1205 and $L_8$ 1255 may be coupled or uncoupled inductors.

Figure 13:
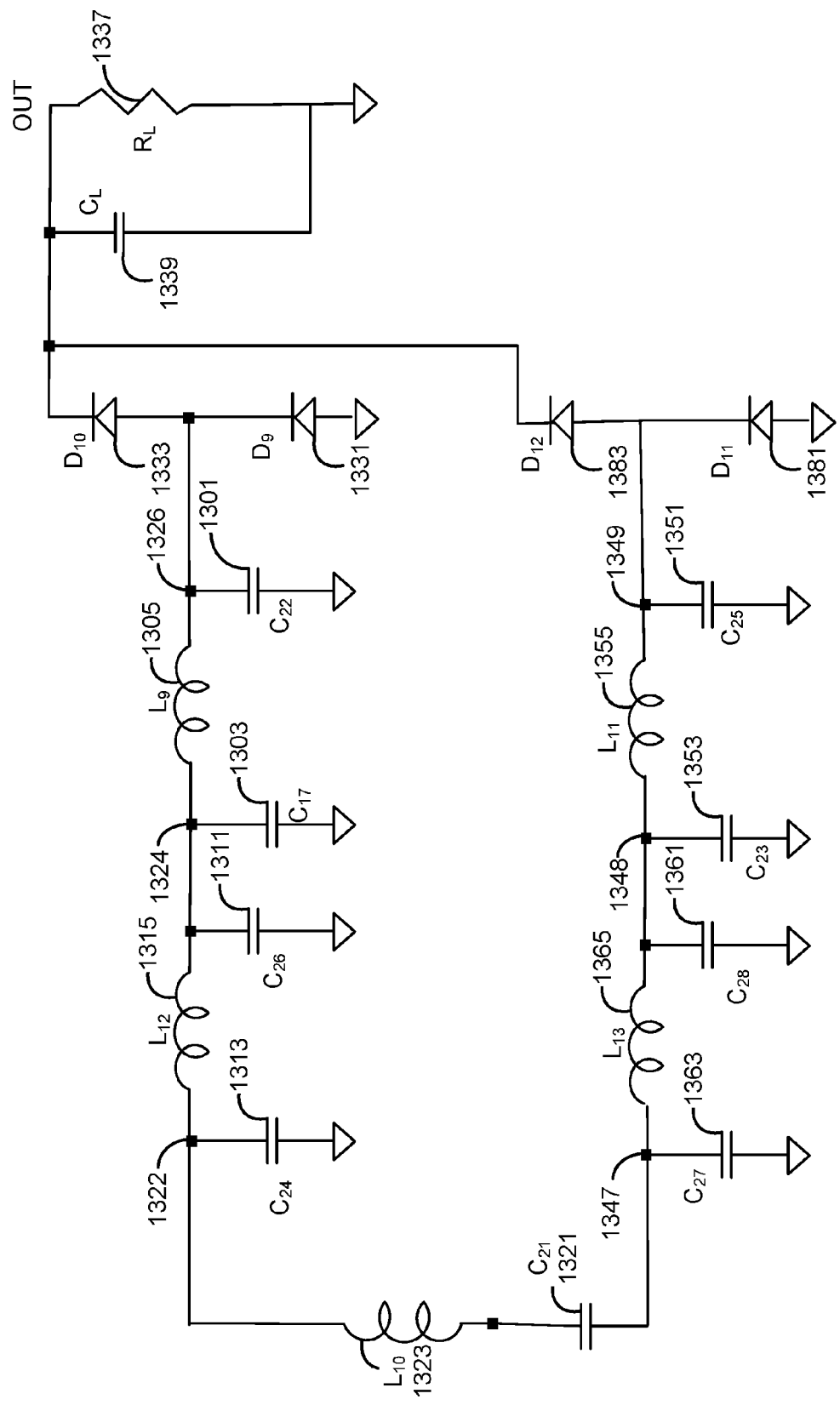
FIG. 13 is an embodiment of a full wave resonant bridge with separate double impedance inversion.

FIG. 13 shows a full bridge embodiment with the double impedance inversion separated from the inductor $L_{10}$ 1323 and capacitance $C_{21}$ 1321, providing better EMI reduction at the expense of complexity. The numbering of elements is similar to that of FIG. 10. In FIG. 13, $C_{24}$ 1313, $L_{12}$ 1315, $C_{26}$ 1311 coupled between first node 1322 and intermediate node 1324 and $C_{27}$ 1363, $L_{13}$ 1365, $C_{28}$ 1361 coupled between third node 1347 and second intermediate node 1348 make up the first impedance inversions for the two legs. $C_{17}$ 1303, $L_9$ 1305, $C_{22}$ 1301 coupled between intermediate node 1324 and second node 1326 and $C_{23}$ 1353, $L_{11}$ 1355, $C_{25}$ 1351 coupled between second intermediate node 1348 and fourth node 1349 make up the second impedance inversions. The rectifier includes the diodes $D_9$ 1331 and $D_{10}$ 1333 on the top leg and diodes $D_{11}$ 1381 and $D_{12}$ 1383 on the bottom leg, which are both then connected on to $C_L$ 1339 and $R_L$ 1337. In its simplest form, the reactance of the first and second impedance inversion are the same, although this is not a requirement. As in the previous embodiments, $C_{22}$ 1301 and $C_{25}$ 1351 can be reduced in value to make up for the rectifier input reactance at a given load, and these capacitances may also be split and placed in parallel with the diodes.

Figure 14:
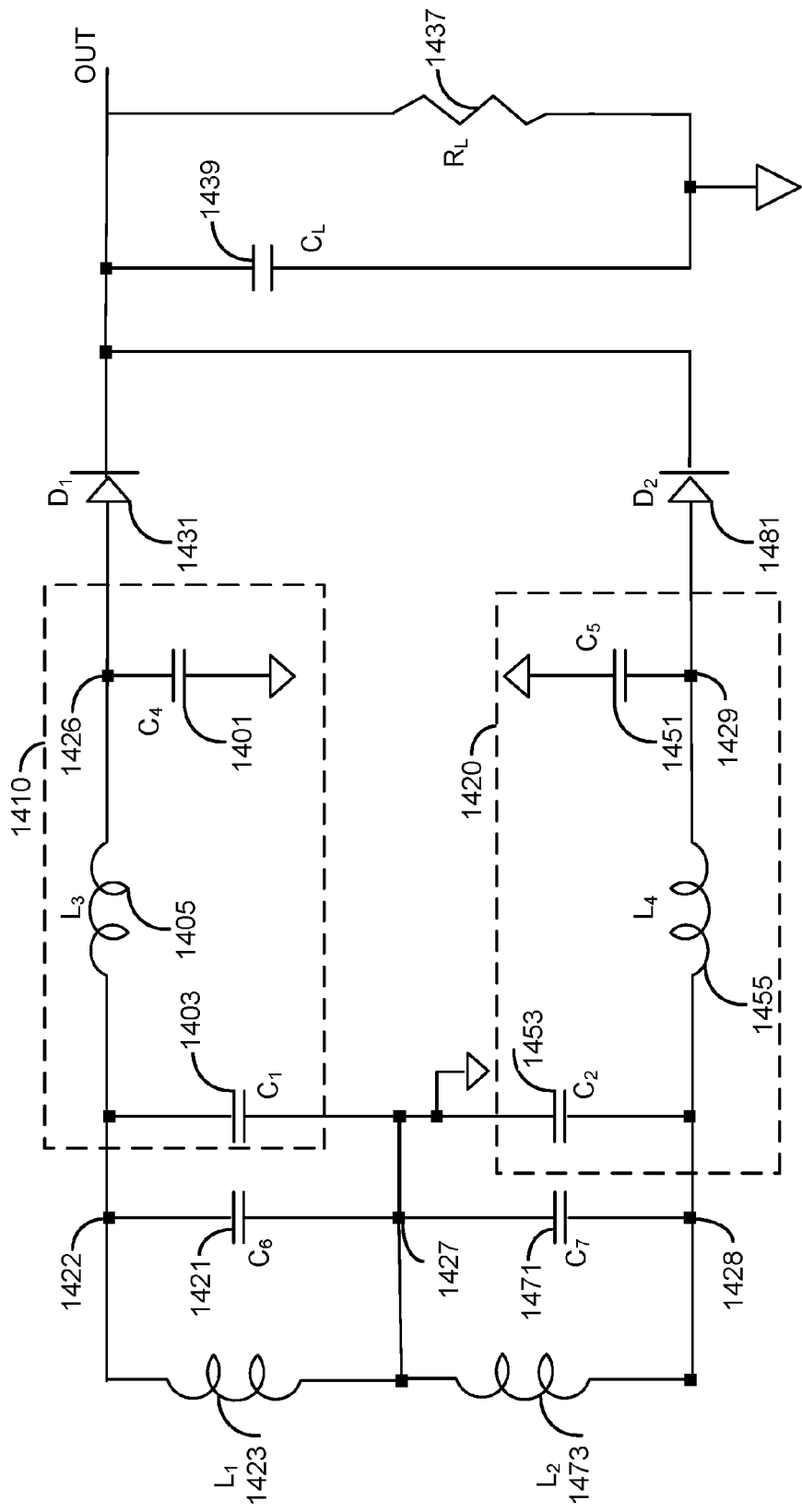
FIG. 14 is an embodiment of a center tapped resonant rectifier with coupler inductance used for first impedance inversion.

The resonant rectifier examples described so far had at least one diode loss (diode drop) on each half of the conduction cycle. In alternative embodiments, a center tapped coupler/antenna can be used along with two anti-phase half wave rectifiers in a resonant configuration so that there is only a diode loss in half of the conduction cycle on each side of the coupler. One such resonant rectifier is shown in FIG. 14, showing a center tapped resonant rectifier with inductance of the receive coupler used for first impedance inversion where the center tapped coupler (e.g., inductor of receive coupler is center tapped) is the pair of loops for the receive inductors $L_1$ 1423 and $L_2$ 1473 and the other elements are numbered similarly to FIG. 12 (i.e., load resistance $R_L$ 1437; upper pi filter 1410 $C_1$ 1403, $L_3$ 1405, $C_4$ 1401 coupled between first node 1422 and second node 1426; lower pi filter 1420 $C_2$ 1453, $L_4$ 1455, $C_5$ 1451 coupled between fourth node 1428 and fifth node 1429; and upper and lower parallel capacitances $C_6$ 1421 coupled between first node 1422 and third node 1427 and $C_7$ 1471 coupled between third node 1427 and fourth node 1428) In the configuration of FIG. 14, there is a potential that each half of the coupler gets significant $2^{nd}$ harmonic. The $2^{nd}$ harmonic from each half of the coupler is substantially cancelled by that of the other side of the coupler. The $2^{nd}$ harmonic may also fall in an ISM band, reducing the need for cancellation of this harmonic. In some cases, the value of the capacitances $C_4$ 1401 and $C_5$ 1451 may be reduced to compensate for the reactance of the rectifier. $C_4$ 1401 and $C_5$ 1451 may be placed directly across the diode ($D_1$ 1431, $D_2$ 1481, respectively) instead of going to ground, with similar performance results since the output OUT of the rectifier is known as an AC ground due to $C_L$ 1439 being close to a short circuit at the frequencies of interest.

Figure 15:
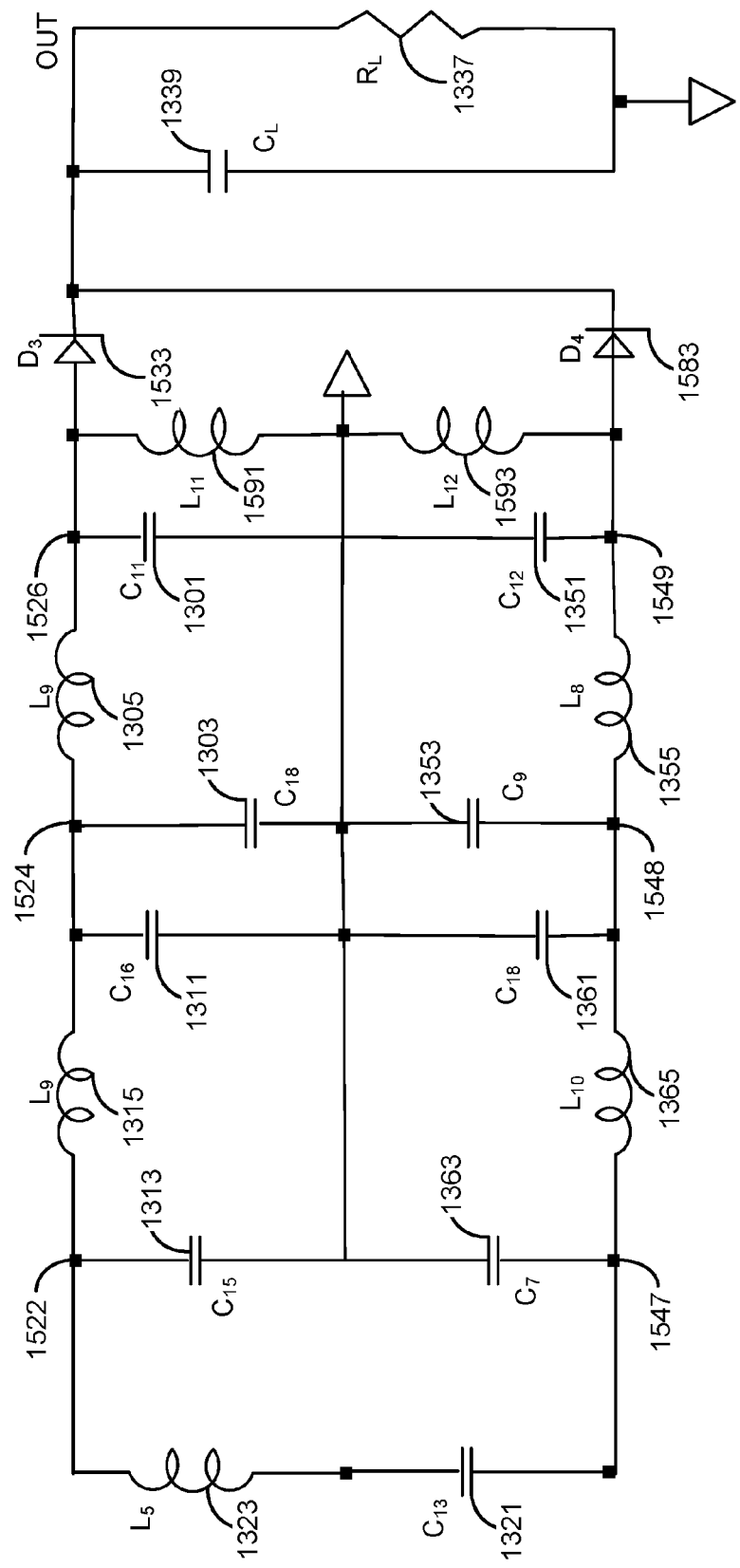
FIG. 15 is an embodiment of a center tapped resonant rectifier with separate first impedance inversion.

FIG. 15 shows an embodiment of resonant rectifier with inductors separate from the receive coupler for the first impedance inversion, where the reference numbers are assigned as in FIG. 13 for a number of corresponding elements. Since the coupler uses a resonant capacitor $C_{13}$ 1321 in series with $L_5$ 1323 in this configuration, DC cannot be passed through the coupler of loop $L_5$ 1323. $L_{11}$ 1591 and $L_{12}$ 1593 are added to the circuit to give a DC path to the current flowing in $D_3$ 1533 and $D_4$ 1583. The value of inductance for $L_{11}$ 1591 and $L_{12}$ 1593 can be chosen to be high enough to not have significant impact on the circuit, much like the bias inductors used in a class E amplifier.

Further examples of aspects of embodiments of the invention are defined as follows:

1. A receive circuit for wireless transfer of power. The receive circuit includes a receive coupler including a resonant circuit including a receive inductor and a first capacitor through which the receive inductor is connected to a first node. The receive circuit further includes a first pi filter connected between the first node and an intermediate node, including a second capacitance connected between the first node and ground, a third capacitance connected between the intermediate node and ground, and a first inductance connected between the first node and the intermediate node. Impedances of the second capacitance, the third capacitance, and the first inductance are formed to provide a first impedance inversion function for the first pi filter whereby impedance at the first node varies inversely with impedance at the intermediate node in a first frequency band. The receive circuit further includes a second pi filter connected between the intermediate node and a second node, including a fourth capacitance connected between the intermediate node and ground, a fifth capacitance connected between the second node and ground, and a second inductance connected between the intermediate node and the second node. Impedances of the fourth capacitance, the fifth capacitance, and the second inductance are formed to provide a second impedance inversion function for the second pi filter whereby impedance at the intermediate node varies inversely with impedance at the second node in the first frequency band. The receive circuit further includes a rectifier through which the second node is connectable to drive a load.

2. The receive circuit of example 1, wherein the first inductance, the second capacitance and the third capacitance are formed to have substantially the same impedance in the first frequency band, and wherein the second inductance, the fourth capacitance and fifth capacitance are formed to have substantially the same impedance in the first frequency band.

3. The receive circuit of any of the examples 1 or 2, wherein the third and fourth capacitances are implemented as a single capacitor.

4. The receive circuit of any of the examples 1-3, wherein the first frequency band is a 6.78 MHz ISM frequency band.

5. The receive circuit of any of the examples 1-4, wherein the first frequency band corresponds to a resonant frequency of the receive coupler.

6. The receive circuit of any of the examples 1-6, wherein the first frequency band corresponds to a frequency of a magnetic field for wirelessly coupling the power.

7. The receive circuit of any of examples 1, 2, or 4-6, wherein the first capacitance is formed to have an impedance that is substantially the same as an impedance of the receive inductor in the first frequency band.

8. The receive circuit of any of examples 1-7, wherein the receive inductor is connected between the first node and ground and wherein the rectifier is a voltage doubler type of rectifier.

9. The receive circuit of any of the examples 1-8, wherein the first and second inductances are formed to have substantially the same impedance.

10. The receive circuit of any of examples 1-9, wherein the receive inductor is connected between the first node and a third node and the receive circuit further includes third and fourth pi filters connected in series between the third node and a fourth node and both configured to provide an impedance inversion function in the first frequency band, wherein the rectifier is further connectable through the fourth node to drive the load.

11. The receive circuit of any of examples 1-9, wherein the receive inductor is connected between the first node and a third node and the receive circuit further includes third and fourth pi filters connected in series between the third node and a fourth node and both configured to provide an impedance inversion function in the first frequency band and third and fourth inductances respectively connected to the second and fourth nodes and ground, wherein the rectifier includes a first diode, through which the second node is connectable to drive the load, and a second diode, through which the fourth node is connectable to drive the load.

12. The receive circuit of any of examples 1-11, wherein the first and second pi filters are configured to reduce electromagnetic interference generated in the receive coupler.

13. A receive circuit for wireless transfer of power. The receive circuit includes a receive coupler including a first receive inductor connected to a first node. The receive circuit further includes a first capacitance connected between the first node and ground. The first receive inductor and the first capacitance are formed to have substantially equal but opposite reactances in a first frequency band. The receive circuit further includes a first pi filter connected between the first node and a second node, including a second capacitance connected between the first node and ground, a third capacitance connected between the second node and ground, and a first inductance connected between the first node and the second node. Impedances of the second capacitance, the third capacitance, and the first inductance are formed to provide an impedance inversion function for the first pi filter whereby impedance at the first node varies inversely with impedance at the second node in the first frequency band. The receive circuit further includes a rectifier through which the second node is connectable to drive a load.

14. The receive circuit of example 13, wherein the first inductance, second capacitance and the third capacitance are formed to have substantially the same impedance in the first frequency band.

15. The receive circuit of any of examples 13 or 14, wherein the first and second capacitances are implemented as a single capacitor.

16. The receive circuit of any of examples 13-15, wherein the first frequency band is a 6.78 MHz ISM frequency band.

17. The receive circuit of any of examples 13-16, wherein the first frequency band corresponds to a resonant frequency of the receive coupler.

18. The receive circuit of any of examples 13-17, wherein the first frequency band corresponds to a frequency of a magnetic field for wirelessly coupling the power.

19. The receive circuit of any of examples 13-18, wherein the first receive inductor is connected between the first node and ground, the rectifier is a voltage doubler type of rectifier, and the receive circuit further includes a fourth capacitance through which the rectifier is connected to the second node.

20. The receive circuit of any of examples 13-18, wherein the first receive inductor is connected between the first node and a third node, the receive circuit further includes a fourth capacitance connected between the third node and ground and a second pi filter connected between the third node and a fourth node that is configured to provide an impedance inversion function in the first frequency band, wherein the rectifier is further connectable through the fourth node to drive the load.

21. The receive circuit of any of examples 13-18, wherein the first receive inductor is connected between the first node and a third node and the receive circuit further includes a second receive inductor connected between the third node and a fourth node, a fourth capacitance connected between the fourth node and ground, and a second pi filter connected in series between the fourth node and a fifth node, and that is configured to provide an impedance inversion function in the first frequency band, wherein the rectifier includes a first diode, through which the second node is connectable to drive the load, and a second diode, through which the fifth node is connectable to drive the load.

22. The receive circuit of any of examples 13-21, wherein the first and second pi filters are configured to reduce electromagnetic interference generated in the receive coupler.

23. A receive circuit for wireless transfer of power. The receive circuit includes a receive coupler configured to wirelessly couple power via a wireless field, the receive coupler including a receive inductor. The receive circuit further includes a rectifier connectable to drive a load. The receive circuit further includes first filtering means configured to provide a first impedance inversion function in a first frequency band. The receive circuit further includes second filtering means configured to provide a second impedance inversion function in the first frequency band, where the receive inductor is connected to the rectifier through the first and second filtering means connected in series.

24. The receive circuit of example 23, further including a first capacitance through which the receive inductor is connected to a first node, wherein the first filtering means includes a first pi filter connected between the first node and an intermediate node, the second filtering means includes a second pi filter connected between the intermediate node and a second node, and the rectifier is connectable through the second node to drive the load.

25. The receive circuit of example 23, further including a first capacitance connected between a first node, to which the receive inductor is connected, and ground, wherein the first filtering means includes the receive inductor and first capacitance, the receive inductor and the first capacitance being formed to have equal but opposite reactances in the first frequency band, and wherein the second filtering means includes a pi filter connected between the first node and a second node, and the rectifier is connectable through the second node to drive the load.

26. A receive circuit for wireless transfer of power. The receive circuit includes a receive coupler configured to inductively receive power via a magnetic field that has a frequency, the receive coupler including a resonant circuit that includes an inductive loop electrically coupled in series to a capacitive element, the resonant circuit configured to resonate at the frequency of the magnetic field. The receive circuit further includes a rectifier electrically coupled to the receive coupler and configured to provide an output to power or charge a load. The receive circuit further includes a first filter circuit electrically coupled between the receive coupler and the rectifier. The receive circuit further includes a second filter circuit electrically coupled between the first filter circuit and the rectifier. The first filter circuit has one or more first reactive elements with values whereby impedance of the first filter circuit as seen at the receive coupler varies inversely with impedance of the second filter circuit, and the second filter circuit has one or more second reactive elements with values whereby impedance of the second filter circuit as seen at the first filter varies inversely with impedance of the rectifier.

27. A receive circuit for wireless transfer of power. The receive circuit includes a receive coupler including a resonant circuit including a receive inductor and a first capacitor through which the receive inductor is coupled to a first node. The receive circuit further includes a first pi filter coupled between the first node and an intermediate node, including a second capacitance coupled between the first node and ground, a third capacitance coupled between the intermediate node and ground, and a first inductance coupled between the first node and the intermediate node. Impedances of the second capacitance, the third capacitance, and the first inductance are configured to provide a first impedance inversion for the first pi filter whereby impedance at the first node varies inversely with impedance at the intermediate node in a first frequency band. The receive circuit further includes a second pi filter coupled between the intermediate node and a second node, including a fourth capacitance coupled between the intermediate node and ground, a fifth capacitance coupled between the second node and ground, and a second inductance coupled between the intermediate node and the second node. Impedances of the fourth capacitance, the fifth capacitance, and the second inductance are configured to provide a second impedance inversion for the second pi filter whereby impedance at the intermediate node varies inversely with impedance at the second node in the first frequency band. The receive circuit further includes a rectifier through which the second node is connectable to drive a load.

The various operations of methods performed by the apparatus or system described above may be performed by any suitable means capable of performing the operations, such as various hardware and/or software component(s), circuits, and/or module(s). Generally, any operations or components illustrated in the Figures may be performed or replaced by corresponding functional means capable of performing the operations of the illustrated components.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such embodiment decisions may not be interpreted as causing a departure from the scope of the embodiments presented here.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor may read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above may also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular embodiment. Thus, the various aspects described here may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the implementations shown herein but is to be accorded the widest scope consistent with the principles and novel features disclosed herein.

What is claimed is:

1. A receive circuit for wireless transfer of power, comprising:
   a receive coupler including a resonant circuit including:
      a receive inductor; and
      a first capacitor through which the receive inductor is connected to a first node;
   a first pi filter separate from the receive inductor, the first pi filter connected between the first node and an intermediate node, including a second capacitance connected between the first node and ground, a third capacitance connected between the intermediate node and ground, and a first inductance connected between the first node and the intermediate node, wherein impedances of the second capacitance, the third capacitance, and the first inductance are formed to provide a first impedance inversion function for the first pi filter whereby impedance at the first node varies inversely with impedance at the intermediate node in a first frequency band;
   a second pi filter separate from the receive inductor, the second pi filter connected between the intermediate node and a second node, including a fourth capacitance connected between the intermediate node and ground, a fifth capacitance connected between the second node and ground, and a second inductance connected between the intermediate node and the second node, wherein impedances of the fourth capacitance, the fifth capacitance, and the second inductance are formed to provide a second impedance inversion function for the second pi filter whereby impedance at the intermediate node varies inversely with impedance at the second node in the first frequency band; and
   a rectifier through which the second node is connectable to drive a load.

2. The receive circuit of claim 1, wherein the first inductance, the second capacitance and the third capacitance are formed to have substantially the same impedance in the first frequency band, and wherein the second inductance, the fourth capacitance and the fifth capacitance are formed to have substantially the same impedance in the first frequency band.

3. The receive circuit of claim 1, wherein the third and fourth capacitances are implemented as a single capacitor.

4. The receive circuit of claim 1, wherein the first frequency band is a 6.78 MHz ISM frequency band.

5. The receive circuit of claim 1, wherein the first frequency band corresponds to a resonant frequency of the receive coupler.

6. The receive circuit of claim 1, wherein the first frequency band corresponds to a frequency of a magnetic field for wirelessly coupling the power.

7. The receive circuit of claim 1, wherein the first capacitance is formed to have an impedance that is substantially the same as an impedance of the receive inductor in the first frequency band.

8. The receive circuit of claim 1, wherein the receive inductor is connected between the first node and ground and wherein the rectifier is a voltage doubler type of rectifier.

9. The receive circuit of claim 1, wherein the first and second inductances are formed to have substantially the same impedance.

10. The receive circuit of claim 1, wherein the receive inductor is connected between the first node and a third node, the receive circuit further comprising:
third and fourth pi filters connected in series between the third node and a fourth node and both configured to provide an impedance inversion function in the first frequency band, wherein the rectifier is further connectable through the fourth node to drive the load.

11. The receive circuit of claim 1, wherein the receive inductor is connected between the first node and a third node, the receive circuit further comprising:
third and fourth pi filters connected in series between the third node and a fourth node and both configured to provide an impedance inversion function in the first frequency band; and
third and fourth inductances respectively connected to the second and fourth nodes and ground,
wherein the rectifier includes a first diode, through which the second node is connectable to drive the load, and a second diode, through which the fourth node is connectable to drive the load.

12. The receive circuit of claim 1, wherein the first and second pi filters are configured to reduce electromagnetic interference generated in the receive coupler.

13. A receive circuit for wireless transfer of power, comprising:
a receive coupler including a first receive inductor connected to a first node;
a first capacitance connected between the first node and ground, wherein the first receive inductor and the first capacitance are formed to have substantially equal but opposite reactances in a first frequency band;
a first pi filter separate from the receive inductor, the first pi filter connected between the first node and a second node, including a second capacitance connected between the first node and ground, a third capacitance connected between the second node and ground, and a first inductance connected between the first node and the second node, wherein impedances of the second capacitance, the third capacitance, and the first inductance are formed to provide an impedance inversion function for the first pi filter whereby impedance at the first node varies inversely with impedance at the second node in the first frequency band; and
a rectifier through which the second node is connectable to drive a load.

14. The receive circuit of claim 13, wherein the first inductance, the second capacitance and the third capacitance are formed to have substantially the same impedance in the first frequency band.

15. The receive circuit of claim 13, wherein the first and second capacitances are implemented as a single capacitor.

16. The receive circuit of claim 13, wherein the first frequency band is a 6.78 MHz ISM frequency band.

17. The receive circuit of claim 13, wherein the first frequency band corresponds to a resonant frequency of the receive coupler.

18. The receive circuit of claim 13, wherein the first frequency band corresponds to a frequency of a magnetic field for wirelessly coupling the power.

19. The receive circuit of claim 13, wherein the first receive inductor is connected between the first node and ground, the rectifier is a voltage doubler type of rectifier, and the receive circuit further comprises:
a fourth capacitance through which the rectifier is connected to the second node.

20. The receive circuit of claim 13, wherein the first receive inductor is connected between the first node and a third node, the receive circuit further comprising:
a fourth capacitance connected between the third node and ground; and
a second pi filter connected between the third node and a fourth node that is configured to provide an impedance inversion function in the first frequency band, wherein the rectifier is further connectable through the fourth node to drive the load.

21. The receive circuit of claim 13, wherein the first receive inductor is connected between the first node and a third node, the receive circuit further comprising:
a second receive inductor connected between the third node and a fourth node;
a fourth capacitance connected between the fourth node and ground; and
a second pi filter connected in series between the fourth node and a fifth node, and that is configured to provide an impedance inversion function in the first frequency band,
wherein the rectifier includes a first diode, through which the second node is connectable to drive the load, and a second diode, through which the fifth node is connectable to drive the load.

22. The receive circuit of claim 13, wherein the first pi filter is configured to reduce electromagnetic interference generated in the receive coupler.

23. A receive circuit for wireless transfer of power, comprising:
a receive coupler configured to wirelessly couple power via a wireless field, the receive coupler including a receive inductor;
a rectifier connectable to drive a load;
first filtering means separate from the receive coupler, the first filtering means configured to provide a first impedance inversion function in a first frequency band; and
second filtering means separate from the receive coupler, the second filtering means configured to provide a second impedance inversion function in the first frequency band, where the receive inductor is connected to the rectifier through the first and second filtering means connected in series.

24. The receive circuit of claim 23, further comprising:
a first capacitance through which the receive inductor is connected to a first node,
wherein the first filtering means includes a first pi filter connected between the first node and an intermediate node, the second filtering means includes a second pi filter connected between the intermediate node and a second node, and the rectifier is connectable through the second node to drive the load.

25. The receive circuit of claim 23, further comprising:
a first capacitance connected between a first node, to which the receive inductor is connected, and ground, wherein the first filtering means includes the receive inductor and first capacitance, the receive inductor and the first capacitance being formed to have equal but opposite reactances in the first frequency band, and wherein the second filtering means includes a pi filter connected between the first node and a second node, and the rectifier is connectable through the second node to drive the load.

26. A receive circuit for wireless transfer of power, comprising:

a receive coupler configured to inductively receive power via a magnetic field that has a frequency, the receive coupler including a resonant circuit that includes an inductive loop electrically coupled in series to a capacitive element, the resonant circuit configured to resonate at the frequency of the magnetic field;

a rectifier electrically coupled to the receive coupler and configured to provide an output to power or charge a load;

a first filter circuit separate from the receive coupler, the first filter circuit electrically coupled between the receive coupler and the rectifier; and a second filter circuit separate from the receive coupler, the second filter circuit electrically coupled between the first filter circuit and the rectifier, wherein the first filter circuit has one or more first reactive elements with values whereby impedance of the first filter circuit as seen at the receive coupler varies inversely with impedance of the second filter circuit, and the second filter circuit has one or more second reactive elements with values whereby impedance of the second filter circuit as seen at the first filter varies inversely with impedance of the rectifier.

\* \* \* \* \*